United States Patent
Yang et al.

(10) Patent No.: US 11,184,134 B2
(45) Date of Patent: Nov. 23, 2021

(54) POWER IMBALANCE SOLUTIONS FOR MULTIPLE INPUT MULTIPLE OUTPUT TRANSMISSIONS

(71) Applicant: QUALCOMM Incorporated, San Diego, CA (US)

(72) Inventors: Wei Yang, San Diego, CA (US); Yi Huang, San Diego, CA (US); Alexandros Manolakos, San Diego, CA (US); Wanshi Chen, San Diego, CA (US); Peter Gaal, San Diego, CA (US); Gokul Sridharan, Sunnyvale, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/702,369

(22) Filed: Dec. 3, 2019

(65) Prior Publication Data

US 2020/0186310 A1 Jun. 11, 2020

(30) Foreign Application Priority Data

Dec. 6, 2018 (GR) ............................. 20180100547

(51) Int. Cl.
*H04L 5/00* (2006.01)
*H04B 7/0456* (2017.01)
*H04W 72/04* (2009.01)

(52) U.S. Cl.
CPC ......... *H04L 5/0051* (2013.01); *H04B 7/0465* (2013.01); *H04W 72/044* (2013.01)

(58) Field of Classification Search
None
See application file for complete search history.

(56) References Cited

U.S. PATENT DOCUMENTS 8,982,978 B2 * 3/2015 Ko ................. H04L 5/0048 375/267
10,848,356 B2 * 11/2020 Hwang ............. H04L 5/0007
(Continued)

FOREIGN PATENT DOCUMENTS

WO WO-2019215874 A1 * 11/2019 ........... H04B 7/0456

OTHER PUBLICATIONS

Mediatek Inc: "Low PAPR RS," 3GPP Draft, 3GPP TSG RAN WG1 Meeting #94bis, R1-1810437, Low PAPR RS V5, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018.*

(Continued)

*Primary Examiner* — Ayaz R Sheikh
*Assistant Examiner* — Faiyazkhan Ghafoerkhan
(74) *Attorney, Agent, or Firm* — Holland & Hart LLP

(57) ABSTRACT

Methods, systems, and devices for wireless communications are described. A transmitting device may identify multiple demodulation reference signal (DMRS) symbols corresponding to multiple DMRS ports of a multiple input multiple output configuration. The transmitting device may generate multiple phase-rotated and precoded DMRS symbols by applying an orthogonal cover code, a phase rotation scheme, and a precoding matrix to the identified DMRS symbols. The transmitting device may map the phase-rotated and precoded DMRS symbols to time-frequency resources corresponding to multiple antenna ports, and transmit a DMRS based on the mapped phase-rotated and precoded DMRS symbols. The transmitting device may transmit the DMRS using multiple antennas that correspond to the antenna ports.

28 Claims, 13 Drawing Sheets

(56) References Cited

U.S. PATENT DOCUMENTS

| | | | |
|---|---|---|---|
| 2013/0129018 A1* | 5/2013 | Ko .................. | H04B 7/065 375/296 |
| 2019/0036746 A1* | 1/2019 | Hwang .............. | H04L 27/3444 |
| 2019/0245737 A1* | 8/2019 | Zhou ................. | H04L 41/0668 |
| 2019/0253941 A1* | 8/2019 | Cirik ................. | H04W 36/0077 |
| 2019/0253986 A1* | 8/2019 | Jeon .................. | H04W 72/042 |
| 2019/0254042 A1* | 8/2019 | Cirik ................. | H04W 74/004 |
| 2019/0306909 A1* | 10/2019 | Zhou ................. | H04W 72/02 |
| 2019/0342062 A1* | 11/2019 | Ren ................... | H04L 27/261 |
| 2020/0007303 A1* | 1/2020 | Ren ................... | H04L 5/0051 |
| 2020/0092814 A1* | 3/2020 | Zhou ................. | H04W 80/02 |
| 2020/0100179 A1* | 3/2020 | Zhou ................. | G06F 1/3209 |
| 2020/0336275 A1* | 10/2020 | Ren ................... | H04L 5/0021 |
| 2021/0022053 A1* | 1/2021 | Cirik ................. | H04W 36/0077 |
| 2021/0028978 A1* | 1/2021 | Zhou ................. | H04B 7/06 |
| 2021/0044372 A1* | 2/2021 | Yang .................. | H04L 1/00 |
| 2021/0044463 A1* | 2/2021 | Hwang .............. | H04L 5/0083 |
| 2021/0084664 A1* | 3/2021 | Bhamri .............. | H04L 5/0057 |

OTHER PUBLICATIONS

[Item U continued]: (Sep. 29, 2018), XP051517846, 12 pages, Retrieved from the Internet: URL:http://www.3gpp.org/ftp/tsg%5Fran/WG1 %5FRL1/TSGR1 %5F94b/Docs/R1 %2D1810437%2Ezi p [retrieved on Sep. 29, 2018] figures 1-3, table 2, sections 2.1,2.1.1,2.1.2.*

Mediatek Inc: "Low PAPR RS," 3GPP Draft, 3GPP TSG RAN WG1 Meeting #94bis, R1-1810437, Low PAPR RS V5, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517846, 12 pages, Retrieved from the Internet: URL:http://www.3gpp.org/ftp/tsg%5Fran/WG1% 5FRL1/TSGR1%5F94b/Docs/R1%2D1810437%2Ezip [retrieved on Sep. 29, 2018] figures 1-3, table 2, sections 2.1, 2.1.1, 2.1.2.

Park C.S., et al., "Evolution of Uplink MIMO for LTE-Advanced," IEEE Communications Magazine, IEEE service Center, Piscataway, US, vol. 49, No. 2, Feb. 1, 2011 (Feb. 1, 2011), XP011334685, pp. 112-121, ISSN: 0163-6804, DOI:10.1109/MCOM.2011.5706318, figure 3, p. 114, left-hand column, p. 115, right-hand column—p. 117, right-hand column.

Partial International Search Report—PCT/US2019/064520—ISA/ EPO—dated Mar. 20, 2020.

Qualcomm Incorporated: "On DLTransmission Schemes 2",3GPP Draft, 3GPP TSG RAN WG1 RAN1 #89, R1-1709734, 3rd Generation Partnership Project (3GPP), Mobile Competence Centre, 650, Route Des Lucioles, F-06921, Sophia-Antipolis Cedex, France, vol. RAN WG1, No. Hangzhou, China, May 15, 2017-May 19, 2017, May 19, 2017 (May 19, 2017), XP051285495, 6 pages, Retrieved from the Internet:URL:http://www.3gpp.org/ftp/tsg_ran/ WG1_RL1/TSGR1_89/Docs/ - -[retrieved on May 19, 2017]section 2.1.

Research in Motion, et al., "Downlink DM-RS Design Considerations for Rank 5-8 in LTE-A," 3GPP Draft, 3GPP TSG RAN WG1 Meeting #59bis, R1-100571, (RIM-DL_DM-RS RANK 5-8), 3rd Generation Partnership Project (3GPP), Mobile Competence Centre, 650, Route Des Lucioles, F-06921, Sophia-Antipolis Cedex, France, vol. RAN WG1, No. Valencia, Spain, Jan. 18, 2010-Jan. 22, 2010, Jan. 12, 2010 (Jan. 12, 2010), XP050418188, 6 pages, [retrieved on Jan. 12, 2010], figures 1, 5, sections 1-3.

International Search Report and Written Opinion—PCT/US2019/ 064520—ISA/EPO—dated Jul. 2, 2020.

* cited by examiner

POWER IMBALANCE SOLUTIONS FOR MULTIPLE INPUT MULTIPLE OUTPUT TRANSMISSIONS

CROSS REFERENCE

The present Application for Patent claims the benefit of Greece Provisional Patent Application No. 20180100547 by YANG, et al., entitled "POWER IMBALANCE SOLUTIONS FOR MULTIPLE INPUT MULTIPLE OUTPUT TRANSMISSIONS," filed Dec. 6, 2018, assigned to the assignee hereof, and expressly incorporated by reference herein.

BACKGROUND

The present disclosure relates to wireless communications, and more specifically to power imbalance solutions for multiple input multiple output transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A transmitter equipped with multiple antennas may communicate with a receiver equipped with multiple antennas using multiple-input multiple-output (MIMO) communications, in which multiple signals are transmitted and/or received using multiple antennas or combinations of antennas. In a MIMO system, the transmitter may transmit demodulation reference signals (DMRSs) associated with multiple data streams (e.g., transmit layers) using multiple DMRS ports. In some cases, a transmitter may define orthogonal DMRS ports by applying an orthogonal cover code (OCC) to the DMRS ports. In addition, the transmitter may apply a precoder to the DMRS to map the transmit layers to time-frequency resources corresponding to transmit antenna ports.

In some cases, the transmitter may apply a particular combination of OCC and precoder to a DMRS that results in a power imbalance (e.g., power difference) between adjacent DMRS symbols. For example, one or more DMRS symbols to be transmitted may have zero power associated with the symbol(s) after applying the OCC and the precoder, and may be adjacent to a DMRS symbol having non-zero power. Power differences between DMRS symbols may cause undesirable transmitter behavior.

SUMMARY

The described techniques relate to improved methods, systems, devices, and apparatuses that support power imbalance solutions for multiple input multiple output transmissions. Generally, the described techniques may enable a transmitting device (such as a UE or base station) to reduce or eliminate power imbalance between adjacent DMRS symbols transmitted during MIMO communications (and in some cases also reduce or eliminate the power imbalance between antenna ports) that may arise when the transmitting device applies certain combinations of OCC and precoder to the DMRS prior to transmission. For example, a transmitting device may apply a phase rotation scheme to the DMRS (e.g., in addition to applying the precoder and OCC) to generate a DMRS that has balanced power across DMRS symbols and, optionally, balanced power across DMRS tones and/or across the antenna ports used to transmit the DMRS. In some cases, the transmitting device may determine (e.g., select) a phase rotation scheme based on the precoder that will be applied, or based on the OCC to be applied, or based on the combination of the precoder and OCC. In some cases, the transmitting device may select the phase rotation scheme to satisfy a power imbalance threshold such that the power difference between DMRS symbols is less than or equal to the power imbalance threshold (e.g., so that there is zero difference in power). In some cases, the transmitter may determine the phase rotation scheme based on other optimization criteria.

A method of wireless communication at a first wireless device is described. The method may include identifying a set of DMRS symbols corresponding to a set of DMRS ports of a multiple input multiple output configuration, generating a set of phase-rotated and precoded DMRS symbols by applying an orthogonal cover code, a phase rotation scheme, and a precoding matrix to the identified set of DMRS symbols, mapping the set of phase-rotated and precoded DMRS symbols to time-frequency resources corresponding to a set of antenna ports, and transmitting, using a set of antennas corresponding to the set of antenna ports, a DMRS based on the mapped set of phase-rotated and precoded DMRS symbols.

An apparatus for wireless communication at a first wireless device is described. The apparatus may include a processor, memory coupled with the processor, and instructions stored in the memory. The instructions may be executable by the processor to cause the apparatus to identify a set of DMRS symbols corresponding to a set of DMRS ports of a multiple input multiple output configuration, generate a set of phase-rotated and precoded DMRS symbols by applying an orthogonal cover code, a phase rotation scheme, and a precoding matrix to the identified set of DMRS symbols, map the set of phase-rotated and precoded DMRS symbols to time-frequency resources corresponding to a set of antenna ports, and transmit, using a set of antennas corresponding to the set of antenna ports, a DMRS based on the mapped set of phase-rotated and precoded DMRS symbols.

Another apparatus for wireless communication at a first wireless device is described. The apparatus may include means for identifying a set of DMRS symbols corresponding to a set of DMRS ports of a multiple input multiple output configuration, generating a set of phase-rotated and precoded DMRS symbols by applying an orthogonal cover code, a phase rotation scheme, and a precoding matrix to the identified set of DMRS symbols, mapping the set of phase-rotated and precoded DMRS symbols to time-frequency resources corresponding to a set of antenna ports, and transmitting, using a set of antennas corresponding to the set of antenna ports, a DMRS based on the mapped set of phase-rotated and precoded DMRS symbols.

A non-transitory computer-readable medium storing code for wireless communication at a first wireless device is described. The code may include instructions executable by a processor to identify a set of DMRS symbols corresponding to a set of DMRS ports of a multiple input multiple output configuration, generate a set of phase-rotated and precoded DMRS symbols by applying an orthogonal cover code, a phase rotation scheme, and a precoding matrix to the identified set of DMRS symbols, map the set of phase-rotated and precoded DMRS symbols to time-frequency resources corresponding to a set of antenna ports, and transmit, using a set of antennas corresponding to the set of antenna ports, a DMRS based on the mapped set of phase-rotated and precoded DMRS symbols.

Some examples of the method, apparatuses, and non-transitory computer-readable medium described herein may further include operations, features, means, or instructions for applying the phase rotation scheme to a set of data symbols corresponding to the set of DMRS ports of the multiple input multiple output configuration, the set of data symbols associated with the identified set of DMRS symbols.

Some examples of the method, apparatuses, and non-transitory computer-readable medium described herein may further include operations, features, means, or instructions for receiving an indication of the phase rotation scheme.

Some examples of the method, apparatuses, and non-transitory computer-readable medium described herein may further include operations, features, means, or instructions for determining, by the first wireless device, the phase rotation scheme to apply to the identified set of DMRS symbols.

In some examples of the method, apparatuses, and non-transitory computer-readable medium described herein, determining the phase rotation scheme may include operations, features, means, or instructions for determining the phase rotation scheme to apply to the identified set of DMRS symbols to maintain a power difference between DMRS symbols of the set of phase-rotated and precoded DMRS symbols less than or equal to a power difference threshold for DMRS symbols transmitted by the first wireless device.

In some examples of the method, apparatuses, and non-transitory computer-readable medium described herein, determining the phase rotation scheme may include operations, features, means, or instructions for determining the phase rotation scheme to apply to the identified set of DMRS symbols to maintain a zero power difference between DMRS symbols of the set of phase-rotated and precoded DMRS symbols that may be transmitted by the first wireless device using a same antenna port of the set of antenna ports.

In some examples of the method, apparatuses, and non-transitory computer-readable medium described herein, the zero power difference may be further between each pair of two antenna ports of the set of antenna ports.

In some examples of the method, apparatuses, and non-transitory computer-readable medium described herein, determining the phase rotation scheme may include operations, features, means, or instructions for selecting, from a set of phase rotation schemes, the phase rotation scheme to apply to the identified set of DMRS symbols.

In some examples of the method, apparatuses, and non-transitory computer-readable medium described herein, the phase rotation scheme of the set of phase rotation schemes corresponds to the set of DMRS ports, and a second phase rotation scheme of the set of phase rotation schemes corresponds to a second set of DMRS ports for DMRS.

In some examples of the method, apparatuses, and non-transitory computer-readable medium described herein, the phase rotation scheme to apply corresponds to the precoding matrix to apply, and a second phase rotation scheme of the set of phase rotation schemes corresponds to a second precoding matrix.

Some examples of the method, apparatuses, and non-transitory computer-readable medium described herein may further include operations, features, means, or instructions for identifying two or more phase rotation schemes of the set of phase rotation schemes as corresponding to the set of DMRS ports, where the phase rotation scheme to apply may be selected from the two or more phase rotation schemes.

In some examples of the method, apparatuses, and non-transitory computer-readable medium described herein, the phase rotation scheme may be selected from the two or more phase rotation schemes based on a HARQ process identifier, or a redundancy version identifier, or a slot index, or a precoder granularity, or a transmission reception point identifier, or a quasi-colocation identifier, or a resource block identifier, or a combination thereof.

In some examples of the method, apparatuses, and non-transitory computer-readable medium described herein, applying the phase rotation scheme may include operations, features, means, or instructions for applying a first phase rotation to the set of DMRS symbols for a first one or more of the set of DMRS ports, and applying a second phase rotation to the set of DMRS symbols for a second one or more of the set of DMRS ports, the second phase rotation different from the first phase rotation.

Some examples of the method, apparatuses, and non-transitory computer-readable medium described herein may further include operations, features, means, or instructions for applying the phase rotation scheme to each physical uplink shared channel transmission of a set of bundled physical uplink shared channel transmissions.

In some examples of the method, apparatuses, and non-transitory computer-readable medium described herein, applying the orthogonal cover code may include operations, features, means, or instructions for applying the orthogonal cover code to the identified set of DMRS symbols in time, or in frequency, or a combination thereof.

In some examples of the method, apparatuses, and non-transitory computer-readable medium described herein, generating the set of phase-rotated and precoded DMRS symbols by applying the orthogonal cover code, the phase rotation scheme, and the precoding matrix to the identified set of DMRS symbols may include operations, features, means, or instructions for applying the orthogonal cover code to the identified set of DMRS symbols, phase rotating, following application of the orthogonal cover code, the identified set of DMRS symbols according to the phase rotation scheme, and precoding, following the phase rotating, the set of phase-rotated and precoded DMRS symbols according to the precoding matrix.

A method of wireless communication at a first wireless device is described. The method may include receiving, from a second wireless device, an indication of a phase rotation scheme applied, by the second wireless device, to a set of DMRS symbols corresponding to a set of DMRS ports to generate a DMRS, receiving the DMRS using a set of antennas of a multiple input multiple output configuration, receiving, using the set of antennas, a data signal associated with the received DMRS, and decoding the received data signal based on the received DMRS and the indicated phase rotation scheme.

An apparatus for wireless communication at a first wireless device is described. The apparatus may include a processor, memory coupled with the processor, and instructions stored in the memory. The instructions may be executable by the processor to cause the apparatus to receive, from a second wireless device, an indication of a phase rotation scheme applied, by the second wireless device, to a set of DMRS symbols corresponding to a set of DMRS ports to generate a DMRS, receive the DMRS using a set of antennas of a multiple input multiple output configuration, receive, using the set of antennas, a data signal associated with the received DMRS, and decode the received data signal based on the received DMRS and the indicated phase rotation scheme.

Another apparatus for wireless communication at a first wireless device is described. The apparatus may include means for receiving, from a second wireless device, an indication of a phase rotation scheme applied, by the second wireless device, to a set of DMRS symbols corresponding to a set of DMRS ports to generate a DMRS, receiving the DMRS using a set of antennas of a multiple input multiple output configuration, receiving, using the set of antennas, a data signal associated with the received DMRS, and decoding the received data signal based on the received DMRS and the indicated phase rotation scheme.

A non-transitory computer-readable medium storing code for wireless communication at a first wireless device is described. The code may include instructions executable by a processor to receive, from a second wireless device, an indication of a phase rotation scheme applied, by the second wireless device, to a set of DMRS symbols corresponding to a set of DMRS ports to generate a DMRS, receive the DMRS using a set of antennas of a multiple input multiple output configuration, receive, using the set of antennas, a data signal associated with the received DMRS, and decode the received data signal based on the received DMRS and the indicated phase rotation scheme.

Some examples of the method, apparatuses, and non-transitory computer-readable medium described herein may further include operations, features, means, or instructions for selecting, based on the received indication of the phase rotation scheme, the phase rotation scheme from a set of phase rotation schemes.

In some examples of the method, apparatuses, and non-transitory computer-readable medium described herein, the phase rotation scheme of the set of phase rotation schemes corresponds to the set of DMRS ports, and a second phase rotation scheme of the set of phase rotation schemes corresponds to a second set of DMRS ports for DMRS.

In some examples of the method, apparatuses, and non-transitory computer-readable medium described herein, the phase rotation scheme corresponds to a first precoding matrix applied by the second wireless device, and a second phase rotation scheme of the set of phase rotation schemes corresponds to a second precoding matrix.

Some examples of the method, apparatuses, and non-transitory computer-readable medium described herein may further include operations, features, means, or instructions for identifying two or more phase rotation schemes of the set of phase rotation schemes as corresponding to the set of DMRS ports, where the phase rotation scheme used to decode the received data signal may be selected from the two or more phase rotation schemes.

In some examples of the method, apparatuses, and non-transitory computer-readable medium described herein, the phase rotation scheme may be selected from the set of phase rotation schemes based on a HARQ process identifier, or a redundancy version identifier, or a slot index, or a precoder granularity, or a transmission reception point identifier, or a quasi-colocation identifier, or a resource block identifier, or a combination thereof.

Some examples of the method, apparatuses, and non-transitory computer-readable medium described herein may further include operations, features, means, or instructions for decoding, based on the indicated phase rotation scheme, each physical uplink shared channel transmission of a set of bundled physical uplink shared channel transmissions.

DETAILED DESCRIPTION

Figure 1:
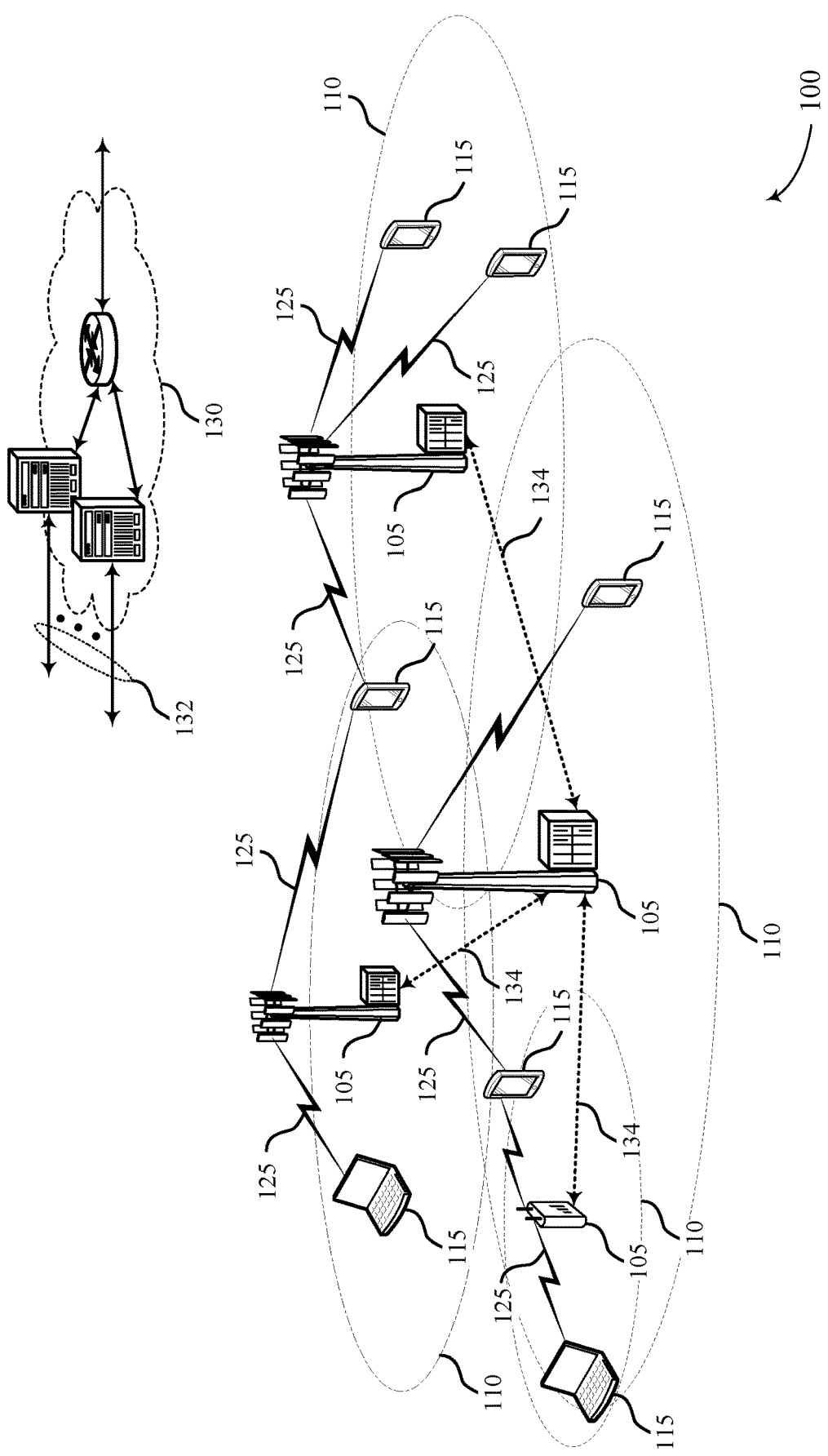
FIG. 1 illustrates an example of a system for wireless communications that supports power imbalance solutions for multiple input multiple output transmissions in accordance with aspects of the present disclosure.

A transmitting device (e.g., a wireless device such as a UE or base station) equipped with multiple antennas may communicate with a receiving device using multiple-input multiple-output (MIMO) communications, in which multiple signals are transmitted using multiple antennas or combinations of antennas. In a MIMO system, the transmitting device may transmit multiple demodulation reference signals (DMRSs) corresponding to multiple data streams (e.g., transmit layers). A DMRS may be transmitted as a sequence of symbols, such as OFDM symbols, and each DMRS may be used by the receiving device to demodulate (e.g., decode) the corresponding data stream.

To help maintain DMRS signal quality during transmission, the transmitter may map the DMRS to orthogonal DMRS ports, which may be conceptual ports having a one-to-one correspondence with the number of DMRSs and data streams to be transmitted. The orthogonal DMRS ports may be determined by applying an orthogonal cover code (OCC) to the DMRS base sequence. In addition, the transmitting device may apply a precoder to the multiple DMRSs to map the DMRSs and corresponding data streams to multiple transmit antenna ports. The number of transmit antenna ports may be the same or larger than the number of DMRS ports.

In some cases, the OCC and the precoder are selected independently, with each selected to achieve different objectives. For example, the OCC may be selected to provide orthogonality between DMRS ports and the precoder may be selected to provide spatial separation from other precoders (e.g., for beamforming).

In some cases, the transmitting device may apply a particular combination of OCC and precoder that results in a power imbalance between adjacent DMRS symbols. For example, after applying the OCC and precoder, one or more DMRS symbols to be transmitted may have zero power associated with the symbol(s), and may be adjacent to a DMRS symbol having non-zero power associated with it. Such power differences between DMRS symbols may cause problems due to various hardware constraints in the transmitting device.

For example, if a zero-power DMRS symbol is transmitted between a DMRS symbol with non-zero power and a data symbol (with non-zero power), there may be a loss of phase continuity between the non-zero DMRS symbol and the data symbol, making it difficult for the receiving device to demodulate the data. In addition, if a zero-power DMRS symbol is transmitted adjacent to a non-zero power DMRS symbol (or a data symbol), the transmitting device may need to ramp the power up and down between symbols. Such power ramping may not occur instantaneously, and the time required to ramp the power up or down may adversely affect the quality of transmissions. Moreover, a transmitting device may be configured to use a particular total power for transmission of two DMRS symbols. If one of the two DMRS symbols consumes zero power, then the power that would have been allocated to that DMRS symbol may instead be allocated to the remaining non-zero power DMRS symbol. However, the transmitting device may be hardware-limited in terms of the amount of power it can produce, and therefore may not be able to transmit the non-zero power DMRS symbol with the full amount of power specified for two symbols-thereby resulting in an overall power loss for the transmitted DMRS.

Thus, it may be desirable to develop new DMRS transmission techniques that are capable of producing a DMRS with improved power balance between or among DMRS symbols. In some cases, a transmitter may apply a phase rotation scheme (e.g., a per-transmit-layer phase rotation scheme) to the DMRS sequence in addition to applying the OCC and precoder. Applying the phase rotation scheme may cause a phase rotation of one or more of the DMRS samples such that adjacent DMRS symbols are associated with similar power (e.g., are power balanced from one DMRS symbol period to a second, adjacent DMRS symbol period).

The transmitting device may select a phase rotation scheme that results in adjacent DMRS symbols satisfying a threshold power imbalance criteria, for example. The threshold power imbalance criteria may include criteria related to a maximum power difference between adjacent DMRS symbols to be transmitted on the same antenna port, for example. In some examples, the threshold power imbalance may specify that the difference in power be zero power difference. In some cases, there may be a set of multiple phase rotation schemes that satisfy the threshold power imbalance criteria, in which case the transmitting device may select a phase rotation scheme from the set that introduces randomization or pseudo-randomization into the DMRS transmission to reduce interference, such as by selecting a phase rotation scheme based on a hybrid automatic repeat request (HARQ) process identifier, a redundancy version identifier, a slot index, a precoder granularity, a transmission reception point (TRP) identifier, a quasi-colocation identifier, a resource block identifier, and/or another transmission characteristic.

In some cases, the transmitter may apply the same phase rotation scheme to the DMRS and to the data corresponding to the DMRS. In this case, the receiving device may be able to demodulate the data using the DMRS as usual, without the knowledge of the phase rotation scheme applied at the transmitter, because both signals include the same phase rotation. In other cases, the transmitting device may not apply the phase rotation scheme to the corresponding data, in which case the receiving device may need to know the phase rotation scheme applied at the transmitter to be able to undo the phase rotation of the DMRS and demodulate the data. In some cases, a transmitting device may transmit an indication of the selected phase rotation scheme to the receiving device.

Aspects of the disclosure are initially described in the context of a wireless communications systems. Aspects of the disclosure are further described in the context of process flows and illustrated using various examples. Aspects of the disclosure are further illustrated by and described with reference to apparatus diagrams, system diagrams, and flowcharts that relate to power imbalance solutions for multiple input multiple output transmissions.

FIG. 1 illustrates an example of a wireless communications system 100 that supports power imbalance solutions for multiple input multiple output transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105 or UE 115) and a receiving device (e.g., a UE 115 or base station 105, respectively), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a transmitting device in wireless communication system 100, such as UE 115 or base station 105, may identify multiple DMRSs to transmit to a receiving device using MIMO transmissions. Each DMRS may be associated with a corresponding data stream, and the DMRS may be used by the receiving device to demodulate the corresponding data stream. The transmitting device may apply an OCC to map the DMRS to orthogonal DMRS ports, and may also apply a precoder to the DMRS to map the DMRS to multiple transmit antenna ports for MIMO transmissions.

In some cases, a transmitting device may also apply a phase rotation scheme (e.g., in addition to the precoder and OCC) to the DMRS before transmitting the DMRS to a receiving device. The phase rotation scheme may be determined (e.g., selected) by the transmitting device to balance the power between adjacent DMRS symbols.

One or more of the base stations 105 or UEs 115 may include a communications manager. When the base station 105 or UE 115 is acting as a transmitting device, the communications manager may identify DMRS symbols corresponding to DMRS ports of a multiple input multiple output configuration, generate phase-rotated and precoded DMRS symbols by applying an orthogonal cover code, a phase rotation scheme, and a precoding matrix to the identified DMRS symbols, and map the phase-rotated and precoded DMRS symbols to time-frequency resources corresponding to a plurality of antenna ports. The communications manager may transmit, using antennas corresponding to the antenna ports, a DMRS based on the mapped phase-rotated and precoded DMRS symbols.

When the base station 105 or UE 115 is acting as a receiving device, the communications manager may receive, from a second wireless device such as UE 115 or base station 105, an indication of a phase rotation scheme applied, by the second wireless device, to DMRS symbols corresponding to DMRS ports to generate a DMRS. The communications manager may receive the DMRS using antennas of a multiple input multiple output configuration, and receive, using the antennas, a data signal associated with the received DMRS. The communications manager may decode the received data signal based on the received DMRS and the indicated phase rotation scheme.

Figure 2:
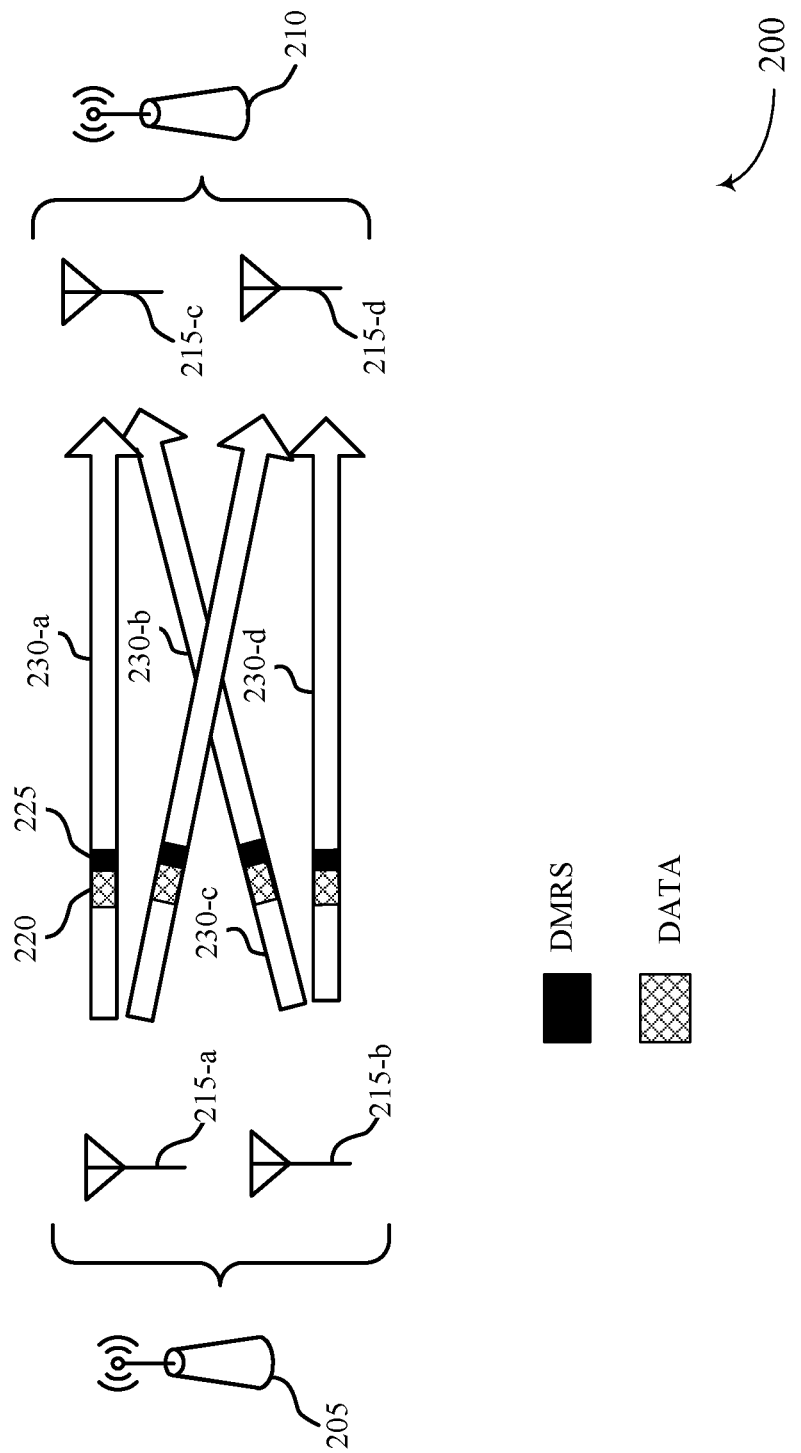
FIG. 2 illustrates an example of a system for wireless communications that supports power imbalance solutions for multiple input multiple output transmissions in accordance with aspects of the present disclosure.

FIG. 2 illustrates an example of a system 200 for wireless communications that supports power imbalance solutions for multiple input multiple output transmissions in accordance with aspects of the present disclosure. System 200 includes transmitting device 205 and receiving device 210, each of which may include multiple antennas 215. Transmitting device 205 and receiving device 210 may be operating in a MIMO mode, in which multiple signals are transmitted and/or received using multiple antennas 215 or combinations of antennas 215. Transmitting device 205 and/or receiving device 210 may be examples of a wireless device, such as UE 115 or base station 105 as described with reference to FIG. 1.

Transmitting device 205 may transmit signals to receiving device 210 on transmission channels 230. In some cases, such signals may include a DMRS 225 and associated data 220. The DMRS may be a sequence that is transmitted in one or more DMRS symbols (e.g., OFDM symbols representing the DMRS sequence). The corresponding data may be transmitted in one or more data symbols (e.g., OFDM symbols representing the data). The DMRS 225 may be used by the receiving device to demodulate the associated data 220.

To improve DMRS transmission quality, in some cases, a transmitting device 205 may apply an OCC to a DMRS sequence to determine orthogonal DMRS ports for transmission of the DMRS.

As an example of applying an OCC to a DMRS sequence to determine orthogonal DMRS ports, consider a DMRS having a sequence (a, b) where a and b are complex numbers with unit magnitude (such as QPSK-modulated symbols or other types of symbols). A transmitting device 205 may create two orthogonal sequences (a, b) and (a, −b) for transmission on two DMRS ports by applying an OCC of [+1, +1], [+1, −1] to the base sequence (a, b) to generate the two orthogonal DMRS sequences (a, b) and (a, −b).

The OCC may be selected or determined by the transmitting device 205 based on the particular DMRS sequence to be transmitted, and the transmitting device 205 may apply the OCC to DMRS samples in the time domain, in the frequency domain, or both. Applying the OCC to DMRS samples in the frequency domain may be referred to as FD-OCC (frequency-domain OCC). Applying the OCC matrix in the time domain may be referred to as TD-OCC (time-domain OCC).

A transmitting device 205 may also apply a precoder to the DMRS sequence (e.g., a same precoder to be used for data associated with the DMRS) to map multiple streams or layers to multiple transmit (Tx) antenna ports of the transmitting device 205, which may correspond to the number of antennas 215 that the transmitting device 205 may use to transmit the DMRS.

For example, assume that a transmitting device 205 includes three Tx antenna ports and the data to be transmitted includes three DMRS samples $[d_1, d_2, d_3]^T$. In this case, a transmitting device 205 may map the three DMRS samples d to the four Tx antennas x by applying a precoding matrix Was follows:

$$x = \begin{bmatrix} x_1 \\ x_2 \\ x_3 \\ x_4 \end{bmatrix} = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \begin{bmatrix} d_1 \\ d_2 \\ d_3 \end{bmatrix}$$

In some cases, a transmitting device 205 may apply both an OCC and a precoder to a DMRS prior to transmission. In this case, the transmitting device may precode and map the DMRS sequence to the transmitting device's antenna ports using the equation $$X = WP_{OCC}S$$

where:
- X represents DMRS symbols as mapped to Tx antenna ports
- W: precoding matrix of size T×L
- $P_{OCC}$: OCC matrix of size L×D that represents the TD/FD OCC on the scheduled DMRS ports
- S: diagonal matrix of size D×D that represents the base DMRS sequence to which the TD/FD OCC is applied
- T: number of Tx antenna ports
- L: number of transmission layers
- D: number of DMRS base samples to which the TD/FD OCC is applied. For example, if only TD-OCC or only FD-OCC is applied, then D=2; if both TD and FD-OCC are applied, then D=4.

Applying certain combinations of OCC and precoder to a DMRS, however, may result in a mapping in which adjacent DMRS symbols have imbalanced (e.g., different) power. Thus, as described in more detail with reference to FIG. 3, in some cases a transmitting device 205 may apply a phase rotation scheme to the DMRS sequence (in addition to applying the OCC and precoder) to reduce or eliminate power differences between or among DMRS symbols.

Figure 3:
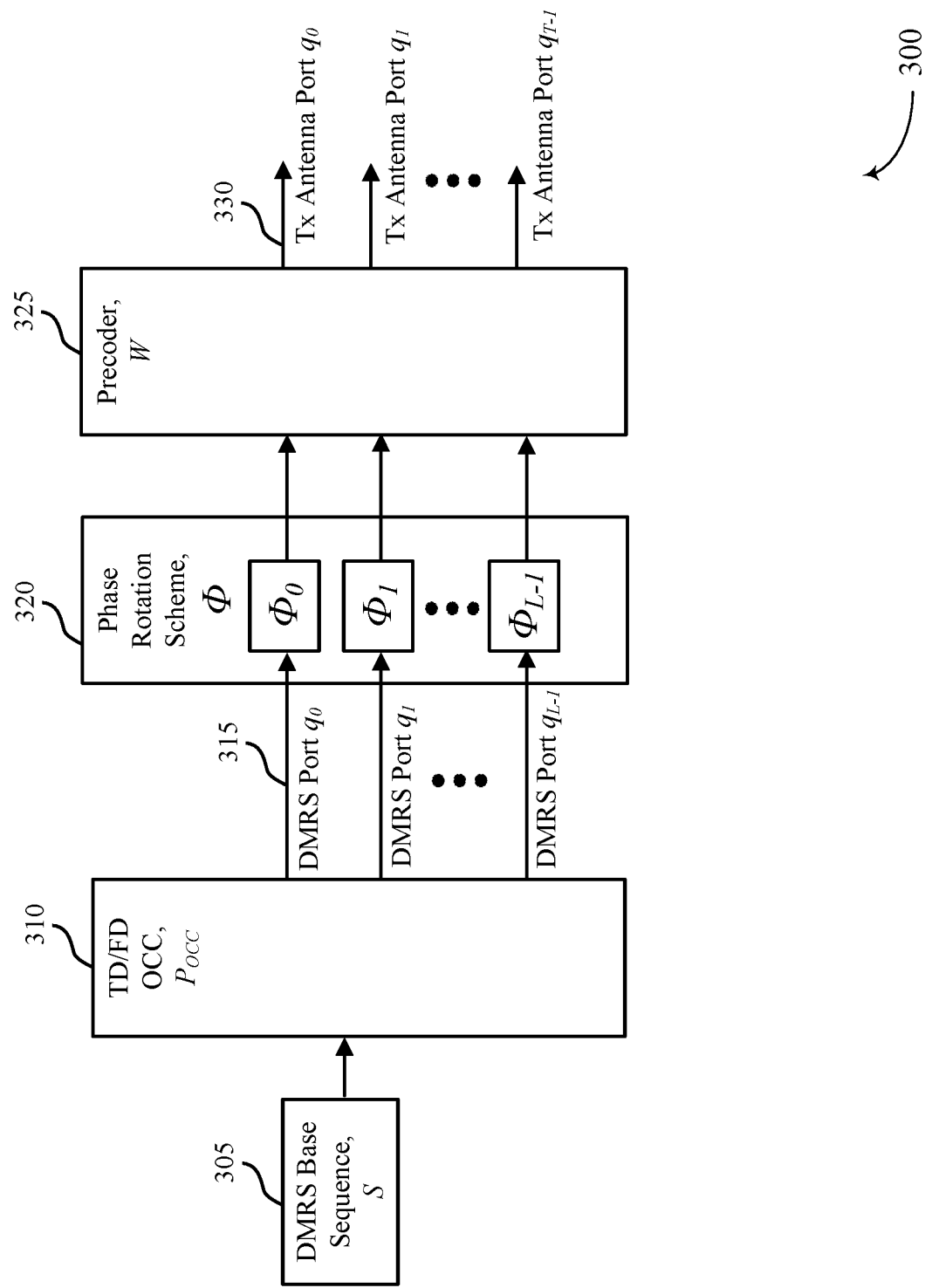
FIG. 3 illustrates an example of a process flow for wireless communications that supports power imbalance solutions for multiple input multiple output transmissions in accordance with aspects of the present disclosure.

FIG. 3 shows a process flow 300 that supports power imbalance solutions for multiple input multiple output transmissions in accordance with aspects of the present disclosure. As depicted by process flow 300, instead of mapping the DMRS to antenna ports using the equation $X = WP_{OCC}S$ as described above, a transmitting device (e.g., transmitting device 205) may map the DMRS to the antenna ports using the equation $$X = W\Phi P_{OCC} S$$

where:
Φ: diagonal matrix of size L×L, where each diagonal element represents a phase rotation applied to each layer (or equivalently, each DMRS port)

That is, the transmitting device may apply phase rotation matrix Φ to the DMRS in addition to applying precoder W and OCC $P_{OCC}$. Phase rotation matrix Φ may be an example of a phase rotation scheme, and other phase rotation schemes may be used. Applying a phase rotation scheme such as phase rotation matrix Φ may result in a mapping of DMRS symbols to antenna ports that balances the power between or across DMRS symbols on each antenna port. In some cases, applying the phase rotation matrix Φ to the DMRS applies a per-transmit-layer phase rotation to the DMRS to mitigate the power imbalance between DMRS symbols transmitted on the transmit antenna ports.

At 310, a transmitting device may apply an OCC to a DMRS base sequence 305 to map the DMRS base sequence 305 to a set of orthogonal DMRS ports 315. In some cases, the number of DMRS ports is equal to the number of layers L for transmission, which may be the number of data streams. In some cases, the transmitting device may apply the OCC to DMRS base sequence 305 in the time domain (using TD OCC), in the frequency domain (using FD OCC), or both. In some cases, the OCC may be determined by the DMRS ports that the transmitting device uses to transmit the DMRS.

At 320, a transmitting device may apply a phase rotation scheme (e.g., a phase rotation matrix Φ) to the DMRS sequence. The phase rotation scheme may be applied on a per-DMRS port basis, for example.

At 325, a transmitting device may apply a precoder W to the phase-rotated DMRS sequence to map the phase-rotated DMRS symbols to a set of transmit antenna ports 330. The number of transmit antenna ports T may be the same as or larger than the number of DMRS ports (e.g., the number of transmission layers, data streams).

In some cases, a transmitting device may apply a phase rotation scheme (e.g., phase rotation matrix Φ) and a precoder at the same time. In this case, 320 and 325 may be combined into a single process by applying a new precoder, Ŵ, to the DMRS sequence, where Ŵ=WΦ. In particular, the new precoder Ŵ may be obtained from the old precoder W by rotating the phase of the column elements of W.

In some cases, a transmitting device may also apply the phase rotation scheme (e.g., phase rotation matrix Φ) to the corresponding data to maintain the phase relationship between the DMRS and the data. In this case, $P_{OCC}S$ (e.g., the DMRS base sequence as mapped to DMRS ports) may be replaced with U, where U of size L×1 denotes the data to be transmitted on L layers simultaneously.

In some cases, each element in a phase rotation matrix Φ may be one of a set of phase rotation values. For example, the set of phase rotation values may include $\{1, j, -1, -j\}$, where "1" indicates no phase rotation, "j" indicates 90 degrees of phase rotation, "−1" indicates 180 degrees of phase rotation, and "−j" indicates 270 degrees of phase rotation. Other sets of phase rotation values may provide more phase granularity; for example, a set of phase rotation values may include $\{e^{j\pi m/3}$ for m=0, ..., 5$\}$, or $\{e^{j\pi m/4}$ for m=0, ..., 7$\}$. Other sets of phase rotation values may be used, depending on the desired granularity of phase rotation.

In some cases, the phase rotation scheme is precoder dependent. That is, a transmitting device may determine a phase rotation matrix Φ to apply to the DMRS based on the selected precoder W (e.g., based on a selected precoding matrix). The phase rotation matrix Φ (or other phase rotation scheme) may be determined based on the selected precoder W such that the resulting DMRS is power-balanced across DMRS symbols on each antenna port and/or potentially across antenna ports after the selected precoder W is applied.

In some cases, the DMRS port combination (e.g., the mapping of the DMRS to DMRS ports using the OCC) determines the number of transmission layers and the OCC applied to the base DMRS sequence. Thus, in some cases, the phase rotation scheme may also depend on the DMRS port combination.

In some cases, a transmitting device may determine a phase rotation scheme to apply to the DMRS based on various factors. For example, in some cases, a transmitting device may determine a phase rotation scheme to apply based on the selected precoder and/or on the OCC.

In some cases, a transmitting device may determine a phase rotation scheme to apply to the DMRS by selecting a phase rotation scheme that maintains a power difference between phase-rotated and precoded DMRS symbols of less than or equal to a power difference threshold for DMRS symbols transmitted by the transmitting device. The power difference threshold may be a maximum allowable power difference between DMRS symbols, for example. In some cases, the power difference threshold for adjacent DMRS symbols may be zero. That is, the maximum allowable power difference between adjacent DMRS symbols may be zero difference such that the power between adjacent DMRS symbols is balanced (e.g., the power associated with the DMRS symbols is substantially the same or matched). In some cases, the zero power difference is maintained between adjacent DMRS symbols transmitted on the same antenna port.

In some cases, the power difference threshold may depend on the number of transmit antenna ports and the number of transmission layers. For example, in some cases, the power difference threshold across or between DMRS tones (e.g., between DMRS samples of a DMRS symbol, where each sample is transmitter on a different subcarrier) may be zero. That is, the maximum allowable power difference between DMRS tones (e.g., between samples of a DMRS symbol transmitted on different subcarriers) may be zero. A transmitting device may select a particular phase rotation scheme to meet this constraint when, for example, two transmit antenna ports and two transmission layers are used, or four transmit antenna ports and two layers, or four transmit antenna ports and four layers. In this case, the transmitting device may apply TD OCC and FD OCC.

However, when four transmit antenna ports and three layers are used, a transmitting device may select a phase rotation scheme such that power is balanced across DMRS symbols on the same antenna port but not necessarily across DMRS tones.

In some cases, a transmitting device may determine a phase rotation scheme based on the set of DMRS ports in use, because the OCC may be different for different DMRS port combinations. For example, in the rank 4 case (e.g., four DMRS ports), with a given precoder, if DMRS ports [0,1,4,5] are used, then a first phase rotation scheme may be used, and if DMRS ports [0,1,2,3] are used, then a second different phase rotation scheme may be used.

In some cases, a transmitting device may determine a phase rotation scheme to apply to the DMRS by selecting a particular phase rotation scheme from a set of two or more predefined phase rotation schemes. For example, each phase rotation scheme in the set may correspond to a particular precoder, or a particular OCC, and/or a particular precoder and OCC combination. The transmitting device may select the appropriate phase rotation scheme from the set based on the selected precoder, OCC, or precoder and OCC combination. In some cases, each phase rotation scheme in the set may correspond to a set of DMRS ports.

For each pair of precoder and DMRS-port combination (e.g., for each combination of precoder and OCC), there may exist multiple phase rotation schemes that balance the power across DMRS symbols. In this case, a transmitting device may determine or select one of the multiple phase rotation schemes to optimize various transmission characteristics, such as introducing randomization into the transmission, by selecting the phase rotation scheme based on a particular deterministic rule. For example, the transmitting device may determine the phase rotation scheme to use as a function of HARQ process ID, revision ID, slot index, etc.

The transmitting device may determine the phase rotation scheme to use as a function of PRG (precoder granularity) index. For example, in a transmission that spans 12 RBs that are split across two PRGs of 6 RBs, then the first 6 RBs (i.e., the first PRG) may use a first phase rotation scheme, and the remaining 6 RBs (i.e., the second PRG) may use a second (different) phase rotation scheme.

For multi-TRP uplink transmissions with repeated transport blocks, the transmitting device may determine the phase rotation scheme to use as a function of a TRP identifier or quasi-colocation identifier. In some cases, if a different precoder (i.e., precoding matrix) is used on different RB groups in the same transmission, then the phase rotation scheme may differ between the different RB groups, depending on the particular precoder in use for that RB group. For example, in a transmission that spans 12 RBs that are split across two RB groups of 6 RBs, then the first RB group may use a first precoder and a first phase rotation scheme, and the second RB group may use a second (different) precoder and a second (different) phase rotation scheme.

For uplink transmissions, if PUSCH bundling is enabled across different PUSCH transmissions, then a transmitting device may apply the same phase rotation scheme across the different PUSCHs, depending on whether the same precoder and OCC are used across the different PUSCHs, or the same group of pairs of precoder and OCC are used across the different PUSCHs. For example, if the same precoder and OCC is used across different PUSCH transmissions in the same PUSCH bundle, then the transmitting device may apply same phase rotation scheme. Otherwise, the transmitting device may or may not apply a different phase rotation scheme. A given phase rotation scheme may work for different pairs of precoders and OCCs; in this case, a transmitting device may apply the same phase rotation scheme across this group of pairs.

In some cases, a transmitting device may receive an indication (e.g., from another wireless device) of a phase rotation scheme to use and may determine the phase rotation scheme based on the indication.

In some cases, a transmitting device may transmit an indication of the phase rotation scheme to the receiving device, such as in cases when the transmitting device does not apply the phase rotation scheme to the data.

In some cases, a receiving device (e.g., a wireless device such as a UE or base station) may receive the phase-rotated DMRS and corresponding data and may demodulate the data using the DMRS. If the transmitting device has applied the same phase rotation scheme to the DMRS and the data, the receiving device may be able to demodulate the data signal using the phase-rotated DMRS symbols, without knowing the phase rotation scheme applied at the transmitter. If the transmitting device has applied the phase rotation scheme to the DMRS but not to the data, the receiving device may require information specifying the phase rotation scheme to be able to demodulate the data signal. For example, the receiving device may need to undo the phase rotation on the DMRS based on the information specifying the phase rotation scheme. Such information may be indicated by the transmitter. That is, the receiving device may receive, from the transmitter, an indication of the phase rotation scheme applied to the DMRS, and may decode the received data signal based on the DMRS and the indicated phase rotation scheme. In some cases, the receiving device may select the phase rotation scheme from a set of two or more phase rotation schemes based on the received indication of the phase rotation scheme.

In some cases, the receiving device may decode each PUSCH transmission of multiple bundled PUSCH transmissions based on the indicated phase rotation scheme.

Figure 4:
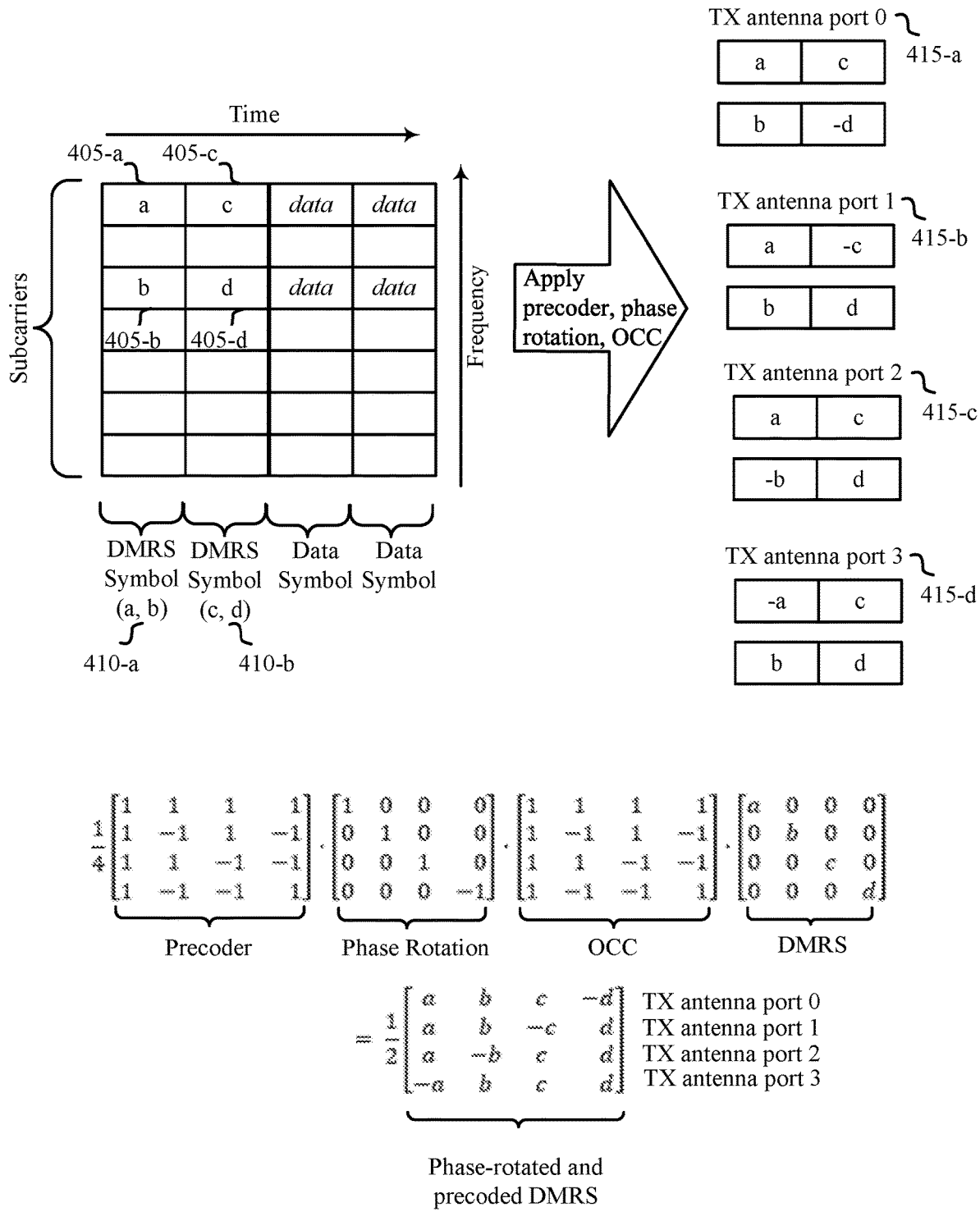
FIG. 4 illustrates an example of a process flow for wireless communications that supports power imbalance solutions for multiple input multiple output transmissions in accordance with aspects of the present disclosure.
Figure 5:
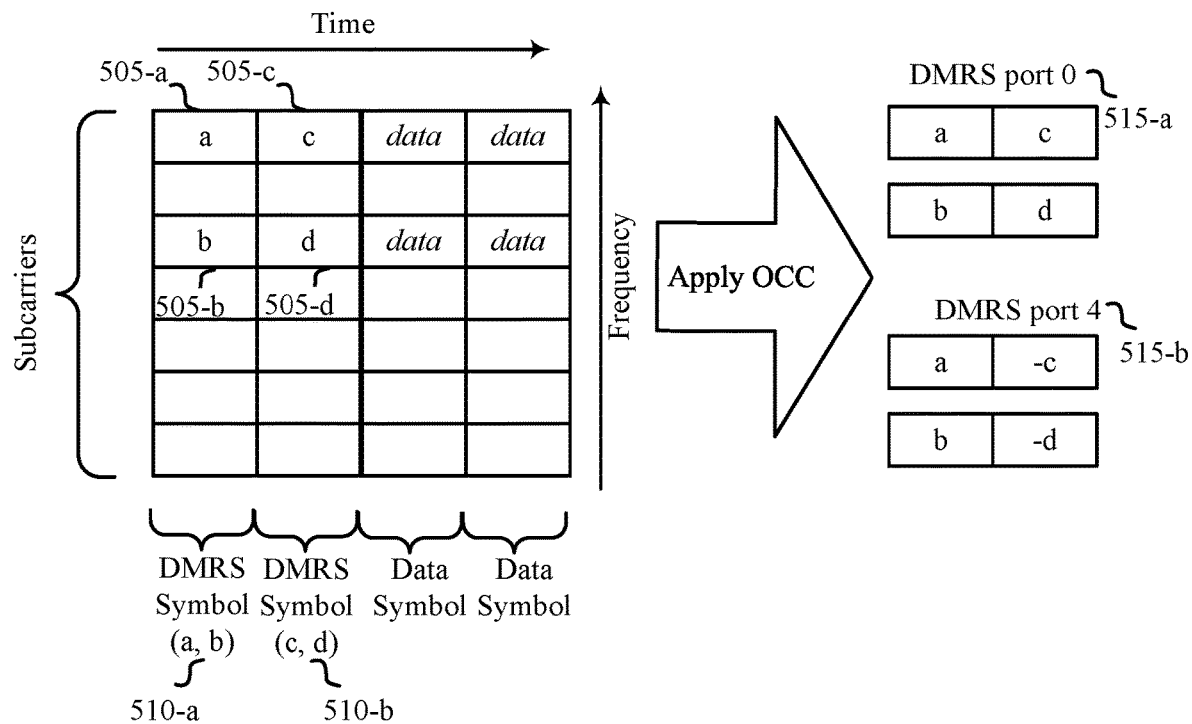
FIG. 5 illustrates an example of a process flow for wireless communications that supports power imbalance solutions for multiple input multiple output transmissions in accordance with aspects of the present disclosure.
Figure 6:
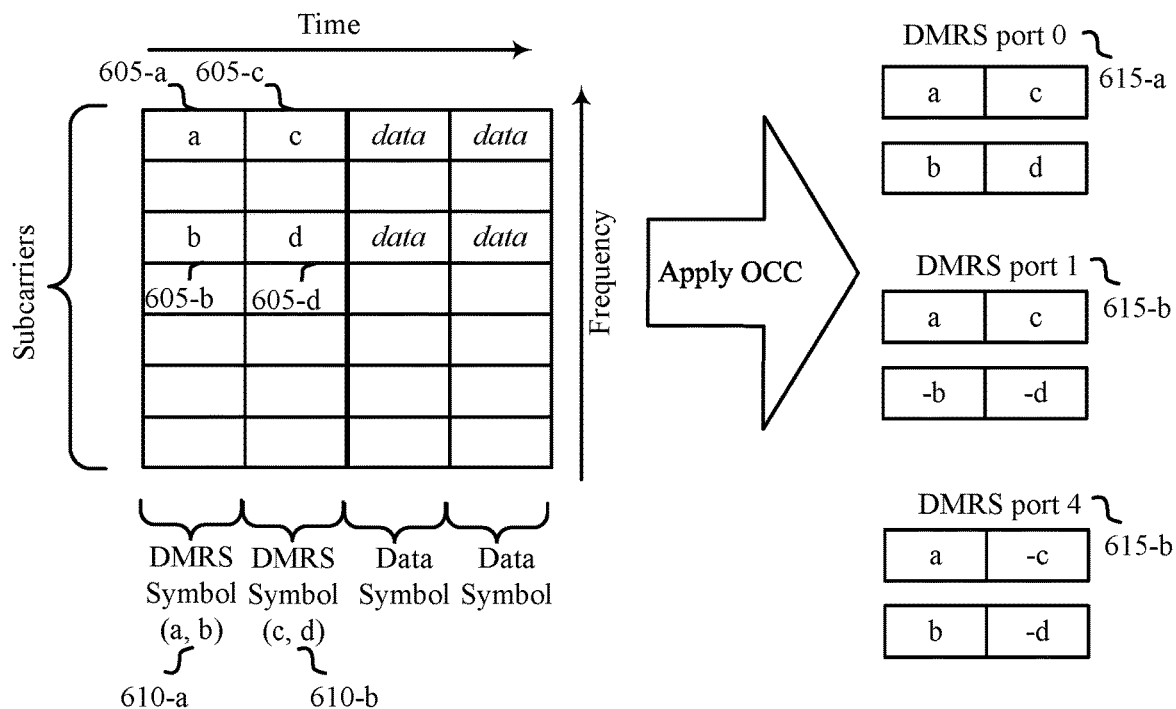
FIG. 6 illustrates an example of a process flow for wireless communications that supports power imbalance solutions for multiple input multiple output transmissions in accordance with aspects of the present disclosure.
Figure 6:
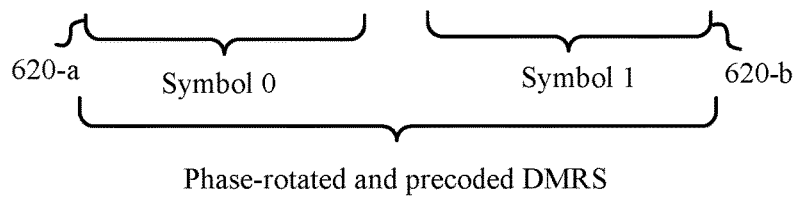

The operation and benefits of process flow 300 are further illustrated by way of examples in FIGS. 4 through 6.

FIG. 4 depicts an example of using a process flow 400 to support power imbalance solutions for multiple input multiple output transmissions in accordance with aspects of the present disclosure. Process flow 400 may be a specific example of using process flow 300 that illustrates mapping four layers (e.g., corresponding to four DMRS ports) to four transmit antenna ports.

In this example, consider a DMRS base sequence S that includes four DMRS samples 405 (a, b, c, d) to be transmitted using four transmit antenna ports 415. A first DMRS symbol 410-$a$ includes samples (a, b) and a second DMRS symbol 410-$b$ includes samples (c, d). The first DMRS symbol 410-$a$ and second DMRS symbol 410-$b$ may be adjacent to each other in time. DMRS samples 405-$a$, 405-$c$ (a, c) may be adjacent to each other in a first subcarrier (e.g., adjacent in time), and DMRS samples 405-$b$, 405-$d$ (b, d) may be adjacent to each other in a second subcarrier (e.g., adjacent in time).

In this example, DMRS base sequence S may be represented as follows:

$$S = \begin{bmatrix} a & 0 & 0 & 0 \\ 0 & b & 0 & 0 \\ 0 & 0 & c & 0 \\ 0 & 0 & 0 & d \end{bmatrix}$$

A transmitting device may select and apply the following OCC matrix to the DMRS sequence to determine the orthogonal DMRS ports for transmission of the DMRS:

$$P_{occ} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

In this example, the OCC matrix is a composition of time-domain OCC and frequency-domain OCC.

The transmitting device may also select and apply the following precoding matrix to map multiple DMRSs (and/or data streams, e.g., the data streams corresponding to the DMRS) to the transmit antenna ports:

$$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Thus, in this example, the transmitting device may perform the following operations to generate a 4×4 matrix that maps the DMRS sequence to the four transmit antenna ports, using the formula $WP_{OCC}S=X$, where X in this case represents precoded DMRS symbols mapped to transmit antenna ports:

$$\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} a & 0 & 0 & 0 \\ 0 & b & 0 & 0 \\ 0 & 0 & c & 0 \\ 0 & 0 & 0 & d \end{bmatrix} = \begin{bmatrix} a & 0 & 0 & 0 \\ 0 & b & 0 & 0 \\ 0 & 0 & c & 0 \\ 0 & 0 & 0 & d \end{bmatrix}$$

The four rows of the final matrix X correspond to the four transmit antenna ports, with "0" values representing zero transmission power (e.g., no sample to be transmitted). That is, the above operations result in the following mappings:

Transmit antenna port 0 is associated with transmission of DMRS samples [a, 0] on a first subcarrier and symbols [0, 0] on a second subcarrier.

Transmit antenna port 1 is associated with transmission of DMRS samples [0, 0] on a first subcarrier and [b, 0] on a second subcarrier.

Transmit antenna port 2 is associated with transmission of DMRS samples [0, c] on a first subcarrier and [0, 0] on a second subcarrier.

Transmit antenna port 3 is associated with transmission of DMRS samples [0, 0] on a first subcarrier and [0, d] on a second subcarrier.

In this example, for each transmit antenna port, there is a symbol with zero power (i.e., that is equal to 0) that is adjacent to a symbol with non-zero power (i.e., that is equal to a, b, c, or d). As previously discussed, power differences between DMRS symbols may cause various problems during transmission, such as a potential loss of phase continuity between symbols and difficulties in ramping power up or down between symbols, for example.

Thus, the transmitting device may apply a phase rotation scheme to the DMRS in addition to applying the precoding matrix and OCC matrix, using the formula $X=W\Phi P_{OCC}S$, where X in this case represents precoded and phase-rotated DMRS symbols mapped to transmit antenna ports (e.g., to time-frequency resources corresponding to the transmit antenna ports).

In this case, the transmitting device may select the following phase rotation scheme to apply to the DMRS:

$$\Phi = \begin{bmatrix} 1 & 0 & 0 & 0 \\ 0 & 1 & 0 & 0 \\ 0 & 0 & 1 & 0 \\ 0 & 0 & 0 & -1 \end{bmatrix}$$

The transmitting device may perform the following operations to generate a 4×4 matrix that maps the DMRS to the four transmit antenna ports using the formula $W\Phi P_{OCC}S=X$:

$$\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} 1 & 0 & 0 & 0 \\ 0 & 1 & 0 & 0 \\ 0 & 0 & 1 & 0 \\ 0 & 0 & 0 & -1 \end{bmatrix} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot$$

$$\begin{bmatrix} a & 0 & 0 & 0 \\ 0 & b & 0 & 0 \\ 0 & 0 & c & 0 \\ 0 & 0 & 0 & d \end{bmatrix} = \frac{1}{2}\begin{bmatrix} a & b & c & -d \\ a & b & -c & d \\ a & -b & c & d \\ -a & b & c & d \end{bmatrix}$$

Thus, in this example, the mapping of precoded and phase-rotated DMRS symbols to transmit antenna ports are represented as:

$$X = \frac{1}{2}\begin{bmatrix} a & b & c & -d \\ a & b & -c & d \\ a & -b & c & d \\ -a & b & c & d \end{bmatrix}$$

The four rows of the matrix X correspond to the four transmit antenna ports, and because the phase rotation scheme has been applied to the DMRS, there are no longer any "0" values. The above operations result in the following mappings:

Transmit antenna port 0 is associated with transmission of DMRS samples [a, c] on a first subcarrier and symbols [b, −d] on a second subcarrier.

Transmit antenna port 1 is associated with transmission of DMRS samples [a, −c] on a first subcarrier and [b, d] on a second subcarrier.

Transmit antenna port 2 is associated with transmission of DMRS samples [a, c] on a first subcarrier and [−b, d] on a second subcarrier.

Transmit antenna port 3 is associated with transmission of DMRS samples [−a, c] on a first subcarrier and [b, d] on a second subcarrier.

In this example, the phase rotation scheme specifies a 180-degree phase rotation on the fourth transmission layer of the four transmission layers to produce a final matrix in which the power of the signal on all resource elements and symbols for all transmit antenna ports 415 are the same (e.g., have zero power difference between them). Equivalently, this phase rotation scheme corresponds to applying a 180-degree phase rotation on the last column of the precoding matrix W.

FIG. 5 depicts an example of using a process flow 500 to support power imbalance solutions for multiple input multiple output transmissions in accordance with aspects of the present disclosure. Process flow 500 may be a specific example of using process flow 300 that illustrates mapping two layers (e.g., using two DMRS ports) to four transmit antenna ports using a phase rotation scheme that applies a 90-degree phase rotation to the second layer.

In this example, the DMRS base sequence S includes four DMRS samples 505 (a, b, c, d) to be transmitted on four transmit antenna ports. DMRS samples (a, c) may be adjacent to each other in a first subcarrier (e.g., adjacent in time), and DMRS samples (b, d) may be adjacent to each other in a second subcarrier (e.g., adjacent in time). In this case, only time-domain OCC is used to generate two orthogonal DMRS ports, and the same operation (e.g., precoding, time-domain OCC, and phase rotation) is applied to DMRS samples on different subcarriers.

For simplicity, we may focus the example on the subcarrier that contains DMRS samples (a, c) in adjacent DMRS symbols. In this case the DMRS base sequence S may be represented as follows:

$$S = \begin{bmatrix} a & 0 \\ 0 & c \end{bmatrix}$$

A transmitting device may select and apply the following OCC matrix to the DMRS sequence to determine the orthogonal DMRS ports 515 for transmission of the DMRS:

$$P_{occ} = \begin{bmatrix} 1 & 1 \\ 1 & -1 \end{bmatrix}$$

The transmitting device may also select and apply the following precoding matrix to map the two DMRS/data streams to the four transmit antenna ports:

$$W = \begin{bmatrix} 1 & 1 \\ 1 & 1 \\ 1 & -1 \\ 1 & -1 \end{bmatrix}$$

In this example, the transmitting device may select (e.g., based on the selected precoder) the following phase rotation scheme to apply a 90-degree phase rotation to the second layer, as indicated by (j):

$$\Phi = \begin{bmatrix} 1 & 0 \\ 0 & j \end{bmatrix}$$

Thus, the transmitting device may perform the following operations to generate a 2×4 matrix that maps the DMRS to the four transmit antenna ports, using the formula $W\Phi P_{OCC}S=X$:

$$\frac{1}{2\sqrt{2}} \begin{bmatrix} 1 & 1 \\ 1 & 1 \\ 1 & -1 \\ 1 & -1 \end{bmatrix} \cdot \begin{bmatrix} 1 & 0 \\ 0 & j \end{bmatrix} \cdot \begin{bmatrix} 1 & 1 \\ 1 & -1 \end{bmatrix} \cdot \begin{bmatrix} a & 0 \\ 0 & c \end{bmatrix} = \frac{1}{2\sqrt{2}} \begin{bmatrix} (1+j)a & (1-j)c \\ (1+j)a & (1-j)c \\ (1-j)a & (1+j)c \\ (1-j)a & (1+j)c \end{bmatrix}$$

In this example, the mapping of precoded and phase-rotated DMRS symbols to transmit antenna ports are represented as:

$$X = \frac{1}{2\sqrt{2}} \begin{bmatrix} (1+j)a & (1-j)c \\ (1+j)a & (1-j)c \\ (1-j)a & (1+j)c \\ (1-j)a & (1+j)c \end{bmatrix}$$

Each row of X corresponds to the signal mapped to a transmit antenna port. In this example, the phase rotation scheme specifies a 90-degree phase rotation on the second transmission layer to produce a final matrix in which the power of the signal on all resource elements and symbols 520 for all transmit antenna ports are the same; e.g., there are no zero-power symbols.

As mentioned earlier, the same OCC, phase rotation scheme, and precoder may be applied to DMRS samples on a different subcarrier. Thus, for base DMRS samples (b, d) on a second subcarrier, the mapping of precoded and phase-rotated DMRS symbols to transmit antenna ports may be represented as:

$$X = \frac{1}{2\sqrt{2}} \begin{bmatrix} (1+j)b & (1-j)d \\ (1+j)b & (1-j)d \\ (1-j)b & (1+j)d \\ (1-j)b & (1+j)d \end{bmatrix}$$

In this example, the phase rotation may not be needed (e.g., the transmitting device may not apply a phase rotation scheme) if a different precoder W is used, such as the following:

$$W = \begin{bmatrix} 1 & 0 \\ 0 & 1 \\ j & 0 \\ 0 & 1 \end{bmatrix}.$$

FIG. 6 depicts an example of using a process flow 600 to support power imbalance solutions for multiple input multiple output transmissions in accordance with aspects of the present disclosure. Process flow 600 may be a specific example of using process flow 300 that illustrates mapping three layers (e.g., using three DMRS ports) to four transmit antenna ports using a phase rotation scheme that applies a 90-degree phase rotation to the third layer.

In this example, the DMRS base sequence S that includes four DMRS samples 605 [a, b, c, d] to be transmitted on four transmit antenna ports. DMRS samples 605-*a*, 605-*b* (a, c) may be adjacent to each other in a first subcarrier (e.g., adjacent in time), and DMRS samples 605-*c*, 605-*d* (c, d) may be adjacent to each other in a second subcarrier (e.g., adjacent in time). DMRS base sequence S may be represented as follows:

$$S = \begin{bmatrix} a & 0 & 0 & 0 \\ 0 & b & 0 & 0 \\ 0 & 0 & c & 0 \\ 0 & 0 & 0 & d \end{bmatrix}$$

A transmitting device may select and apply the following OCC matrix to the DMRS sequence to determine the three orthogonal DMRS ports 615 for transmission of the DMRS:

$$P_{OCC} = \begin{bmatrix} 1 & 1 & 1 & 1 \\ 1 & -1 & 1 & -1 \\ 1 & 1 & -1 & -1 \end{bmatrix}$$

The transmitting device may also select and apply the following precoding matrix to map the three DMRS/data streams to the four transmit antenna ports:

$$W = \begin{bmatrix} 1 & 1 & 1 \\ 1 & 1 & 1 \\ 1 & -1 & -1 \\ 1 & -1 & -1 \end{bmatrix}$$

In this example, the transmitting device may select (e.g., based on the selected precoder) the following phase rotation scheme to apply a 90-degree phase rotation to the second layer, as indicated by (j):

$$\Phi = \begin{bmatrix} 1 & 0 & 0 \\ 0 & 1 & 0 \\ 0 & 0 & j \end{bmatrix}$$

Thus, the transmitting device may perform the following operations to generate a 2×4 matrix that maps the DMRS to the four transmit antenna ports, using the formula $W\Phi P_{OCC}S = X$:

$$\frac{1}{2\sqrt{3}} \begin{bmatrix} 1 & 1 & 1 \\ 1 & 1 & 1 \\ 1 & -1 & -1 \\ 1 & -1 & -1 \end{bmatrix} \cdot \begin{bmatrix} 1 & 0 & 0 \\ 0 & 1 & 0 \\ 0 & 0 & j \end{bmatrix} \cdot \begin{bmatrix} 1 & 1 & 1 & 1 \\ 1 & -1 & 1 & -1 \\ 1 & 1 & -1 & -1 \end{bmatrix} \cdot \begin{bmatrix} a & 0 & 0 & 0 \\ 0 & b & 0 & 0 \\ 0 & 0 & c & 0 \\ 0 & 0 & 0 & d \end{bmatrix} =$$

$$\frac{1}{2\sqrt{3}} \begin{bmatrix} (2+j)a & jb & (2-j)c & -jd \\ (2+j)a & jb & (2-j)c & jd \\ -ja & (2-j)b & jc & (2+j)d \\ -ja & (2-j)b & jc & (2+j)d \end{bmatrix}$$

In this example, the mapping of precoded and phase-rotated DMRS symbols to transmit antenna ports are represented as:

$$X = \frac{1}{2\sqrt{3}} \begin{bmatrix} (2+j)a & jb & (2-j)c & -jd \\ (2+j)a & jb & (2-j)c & jd \\ -ja & (2-j)b & jc & (2+j)d \\ -ja & (2-j)b & jc & (2+j)d \end{bmatrix}$$

Each row of X corresponds to a transmit antenna port. In this example, the phase rotation scheme specifies a 90-degree phase rotation on the third transmission layer to produce a final matrix in which the power of the signal on all symbols 620 and all transmit antenna ports are the same. In this example, the power on different subcarriers of the same DMRS symbol and same antenna port are not the same.

Examples of phase rotation schemes that may be used in combination with a precoding matrix in the context of process flow 300, 400, 500, or 600 (as described with reference to FIGS. 3 through 6, respectively) are included below; such examples are intended to be illustrative rather than exhaustive.

For example, in the case of two transmit antenna ports and two DMRS ports (layers), there may be three 2×2 precoding matrices defined:

$$\frac{1}{\sqrt{2}}\begin{bmatrix} 1 & 0 \\ 0 & 1 \end{bmatrix} \quad \frac{1}{2}\begin{bmatrix} 1 & 1 \\ 1 & -1 \end{bmatrix} \quad \frac{1}{2}\begin{bmatrix} 1 & 1 \\ j & -j \end{bmatrix}$$

In this case, applying the following phase rotation on the second DMRS port of the two DMRS ports may solve the power-imbalance issue for the transmit precoding matrix indications (TPMIs):

TPMI 0: 1 or j or −j or −1

TPMI 1: j or −j

TPMI 2: j or −j

Thus, phase rotation by j on the second DMRS port may work universally for all precoders and all DMRS port combinations. This results in the following phase-rotated precoders:

$$\frac{1}{\sqrt{2}}\begin{bmatrix} 1 & 0 \\ 0 & j \end{bmatrix} \quad \frac{1}{\sqrt{2}}\begin{bmatrix} 1 & j \\ 1 & -j \end{bmatrix} \quad \frac{1}{\sqrt{2}}\begin{bmatrix} 1 & j \\ j & 1 \end{bmatrix}$$

For example, in the case of four transmit antenna ports and two DMRS ports (layers), there may be 22 precoding matrices of size 4×2 defined:

| TPMI index | W (ordered from left to right in increasing order of TPMI index) | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4-7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |

| TPMI index | W (ordered from left to right in increasing order of TPMI index) | | | |
|---|---|---|---|---|
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

In this case, the following phase rotation values applied to the second DMRS port of the two DMRS ports solves the power imbalance issue on all 4 Tx antenna ports defined:

TPMI 0-13: 1 or j or −1, or −j
TPMI 14-21: j or −j

Phase-rotating the second DMRS port is equivalent to phase rotating the second column of the precoding matrix. Thus, the following phase rotation matrix (equivalent to a 90-degree phase rotation on second DMRS port) may work universally for all precoder and all DMRS port combinations:

$$\begin{bmatrix} 1 & 0 \\ 0 & j \end{bmatrix} d$$

For example, in the case of four transmit antenna ports and three DMRS ports (layers), there may be 7 precoding matrices of size 4×3:

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

In this case, the following phase rotation values applied to the third DMRS port may solve the power imbalance issue on all four transmit antenna ports:
TPMI 0-2: 1, or j, or −1, or −j
TPMI 3-6: j or −j Phase-rotating the third DMRS port is equivalent to phase-rotating the third column of the precoding matrix. Thus, the following phase rotation matrix (equivalent to a 90-degree phase rotation on third DMRS port) may work universally for all precoder and all DMRS port combinations:

$$\begin{bmatrix} 1 & 0 & 0 \\ 0 & 1 & 0 \\ 0 & 0 & j \end{bmatrix}$$

For example, in the case of four transmit antenna ports and the rank 4 case (e.g., four DMRS ports), there may be 5 precoding matrices of size 4×4 defined:

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

In this case, different phase-rotation scheme may be needed for different precoding matrices:
TPMI 0: phase rotation is not needed
TPMI 1-2: phase-rotating the second and fourth DMRS port by j or −j, or equivalently using any of the following phase-rotation matrices:

$$\begin{bmatrix} 1 & 0 & 0 & 0 \\ 0 & j & 0 & 0 \\ 0 & 0 & 1 & 0 \\ 0 & 0 & 0 & j \end{bmatrix} \text{ or } \begin{bmatrix} 1 & 0 & 0 & 0 \\ 0 & -j & 0 & 0 \\ 0 & 0 & 1 & 0 \\ 0 & 0 & 0 & -j \end{bmatrix} \text{ or } \begin{bmatrix} 1 & 0 & 0 & 0 \\ 0 & j & 0 & 0 \\ 0 & 0 & 1 & 0 \\ 0 & 0 & 0 & -j \end{bmatrix} \text{ or } \begin{bmatrix} 1 & 0 & 0 & 0 \\ 0 & -j & 0 & 0 \\ 0 & 0 & 1 & 0 \\ 0 & 0 & 0 & j \end{bmatrix}$$

TPMI 3-4: phase-rotating the fourth DMRS port by −1; equivalently, using the following phase-rotation matrix:

$$\begin{bmatrix} 1 & 0 & 0 & 0 \\ 0 & 1 & 0 & 0 \\ 0 & 0 & 1 & 0 \\ 0 & 0 & 0 & -1 \end{bmatrix}$$

Phase-rotating the $i^{th}$ DMRS port may be equivalent to phase-rotating the $i^{th}$ column of the precoding matrix, i=1, 2,3,4.

Figure 7:
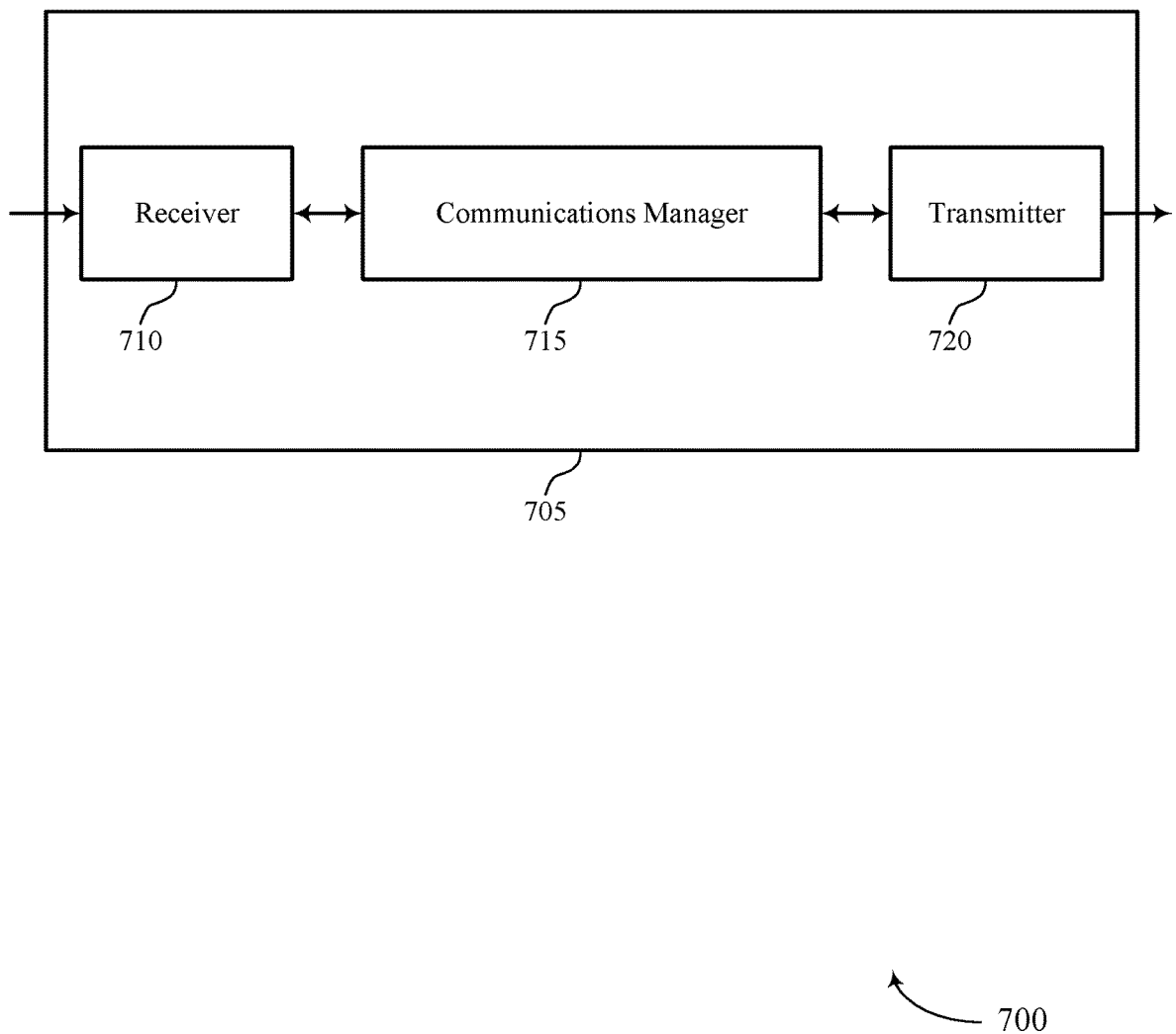
FIGS. 7 and 8 show block diagrams of devices that support power imbalance solutions for multiple input multiple output transmissions in accordance with aspects of the present disclosure.

FIG. 7 shows a block diagram 700 of a device 705 that supports power imbalance solutions for multiple input multiple output transmissions in accordance with aspects of the present disclosure. The device 705 may be an example of aspects of a UE 115 or base station 105 as described herein. The device 705 may include a receiver 710, a communications manager 715, and a transmitter 720. The device 705 may also include one or more processors, memory coupled with the one or more processors, and instructions stored in the memory that are executable by the one or more processors to enable the one or more processors to perform the power imbalance solutions for multiple input multiple output transmissions features discussed herein. Each of these components may be in communication with one another (e.g., via one or more buses).

Receiver 710 may receive information such as packets, user data, or control information associated with various information channels (e.g., control channels, data channels, and information related to power imbalance solutions for multiple input multiple output transmissions, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may identify a set of DMRS symbols corresponding to a set of DMRS ports of a multiple input multiple output configuration, generate a set of phase-rotated and precoded DMRS symbols by applying an orthogonal cover code, a phase rotation scheme, and a precoding matrix to the identified set of DMRS symbols, map the set of phase-rotated and precoded DMRS symbols to time-frequency resources corresponding to a set of antenna ports, and transmit, using a set of antennas corresponding to the set of antenna ports, a DMRS based on the mapped set of phase-rotated and precoded DMRS symbols.

The communications manager 715 may receive, from a second wireless device, an indication of a phase rotation scheme applied, by the second wireless device, to a set of DMRS symbols corresponding to a set of DMRS ports to generate a DMRS, receive the DMRS using a set of antennas of a multiple input multiple output configuration, receive, using the set of antennas, a data signal associated with the received DMRS, and decode the received data signal based on the received DMRS and the indicated phase rotation scheme. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
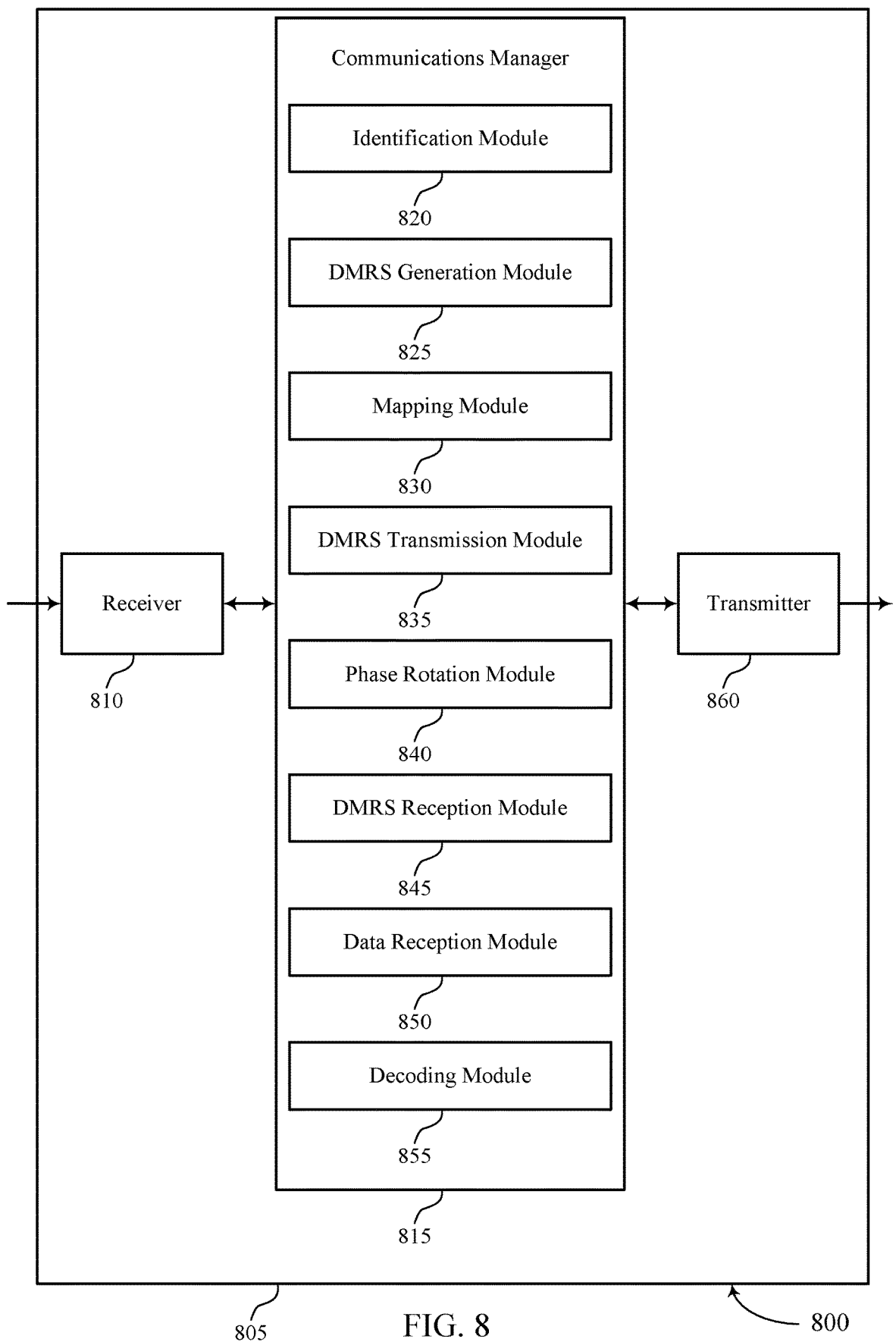

FIG. 8 shows a block diagram 800 of a device 805 that supports power imbalance solutions for multiple input multiple output transmissions in accordance with aspects of the present disclosure. The device 805 may be an example of aspects of a device 705, a UE 115, or a base station 105 as described herein. The device 805 may include a receiver 810, a communications manager 815, and a transmitter 860. The device 805 may also include a processor. Each of these components may be in communication with one another (e.g., via one or more buses).

Receiver 810 may receive information such as packets, user data, or control information associated with various information channels (e.g., control channels, data channels, and information related to power imbalance solutions for multiple input multiple output transmissions, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include an identification module 820, a DMRS generation module 825, a mapping module 830, a DMRS transmission module 835, a phase rotation module 840, a DMRS reception module 845, a data reception module 850, and/or a decoding module 855. The communications manager 815 may be an example of aspects of the communications manager 1010 or 1110 as described herein.

The identification module 820 may identify a set of DMRS symbols corresponding to a set of DMRS ports of a multiple input multiple output configuration.

The DMRS generation module 825 may generate a set of phase-rotated and precoded DMRS symbols by applying an orthogonal cover code, a phase rotation scheme, and a precoding matrix to the identified set of DMRS symbols.

The mapping module 830 may map the set of phase-rotated and precoded DMRS symbols to time-frequency resources corresponding to a set of antenna ports.

The DMRS transmission module 835 may transmit, using a set of antennas corresponding to the set of antenna ports, a DMRS based on the mapped set of phase-rotated and precoded DMRS symbols.

The phase rotation module 840 may receive, from a second wireless device, an indication of a phase rotation scheme applied, by the second wireless device, to a set of DMRS symbols corresponding to a set of DMRS ports to generate a DMRS.

The DMRS reception module 845 may receive the DMRS using a set of antennas of a multiple input multiple output configuration.

The data reception module 850 may receive, using the set of antennas, a data signal associated with the received DMRS.

The decoding module 855 may decode the received data signal based on the received DMRS and the indicated phase rotation scheme.

Transmitter 860 may transmit signals generated by other components of the device 805. In some examples, the transmitter 860 may be collocated with a receiver 810 in a transceiver module. For example, the transmitter 860 may be an example of aspects of the transceiver 1020 or 1120 as described with reference to FIGS. 10 and 11. The transmitter 860 may utilize a single antenna or a set of antennas.

In some cases, the identification module 820, DMRS generation module 825, mapping module 830, DMRS transmission module 835, phase rotation module 840, DMRS reception module 845, data reception module 850, and/or decoding module 855 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the identification module 820, DMRS generation module 825, mapping module 830, DMRS transmission module 835, phase rotation module 840, DMRS reception module 845, data reception module 850, and/or decoding module 855 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
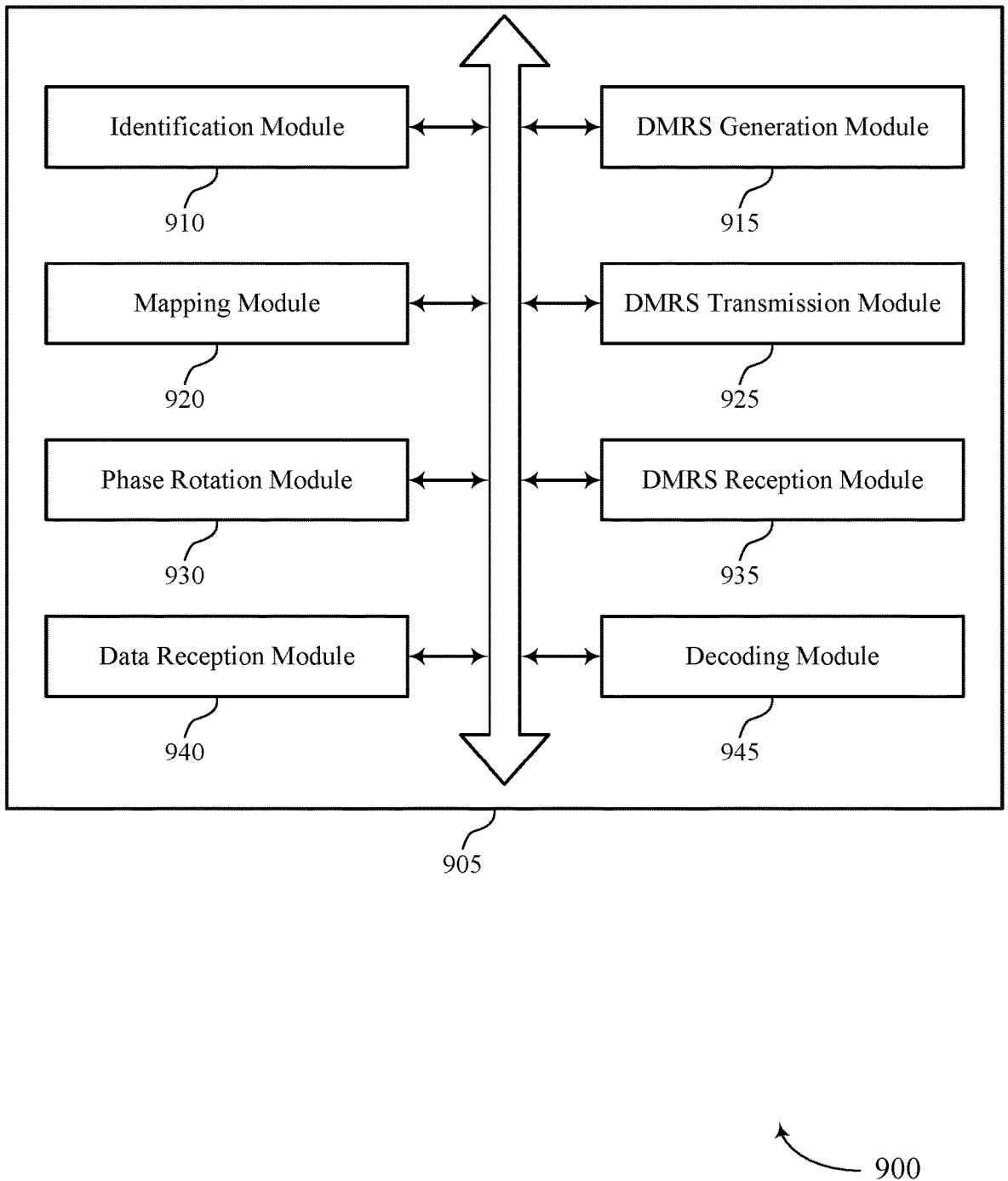
FIG. 9 shows a block diagram of a communications manager that supports power imbalance solutions for multiple input multiple output transmissions in accordance with aspects of the present disclosure.

FIG. 9 shows a block diagram 900 of a communications manager 905 that supports power imbalance solutions for multiple input multiple output transmissions in accordance with aspects of the present disclosure. The communications manager 905 may be an example of aspects of a communications manager 715, a communications manager 815, or a communications manager 1010 described herein. The communications manager 905 may include an identification module 910, a DMRS generation module 915, a mapping module 920, a DMRS transmission module 925, a phase rotation module 930, a DMRS reception module 935, a data reception module 940, and/or a decoding module 945. Each of these modules may communicate, directly or indirectly, with one another (e.g., via one or more buses).

The identification module 910 may identify a set DMRS symbols corresponding to a set of DMRS ports of a multiple input multiple output configuration.

The DMRS generation module 915 may generate a set of phase-rotated and precoded DMRS symbols by applying an orthogonal cover code, a phase rotation scheme, and a precoding matrix to the identified set of DMRS symbols.

The mapping module 920 may map the set of phase-rotated and precoded DMRS symbols to time-frequency resources corresponding to a set of antenna ports.

The DMRS transmission module 925 may transmit, using a set of antennas corresponding to the set of antenna ports, a DMRS based on the mapped set of phase-rotated and precoded DMRS symbols.

The phase rotation module 930 may receive, from a second wireless device, an indication of a phase rotation scheme applied, by the second wireless device, to a set of DMRS symbols corresponding to a set of DMRS ports to generate a DMRS.

The DMRS reception module 935 may receive the DMRS using a set of antennas of a multiple input multiple output configuration.

The data reception module 940 may receive, using the set of antennas, a data signal associated with the received DMRS.

The decoding module 945 may decode the received data signal based on the received DMRS and the indicated phase rotation scheme.

In some cases, the identification module 910, DMRS generation module 915, mapping module 920, DMRS transmission module 925, phase rotation module 930, DMRS reception module 935, data reception module 940, and/or decoding module 945 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the identification module 910, DMRS generation module 915, mapping module 920, DMRS transmission module 925, phase rotation module 930, DMRS reception module 935, data reception module 940, and/or decoding module 945 discussed herein.

Figure 10:
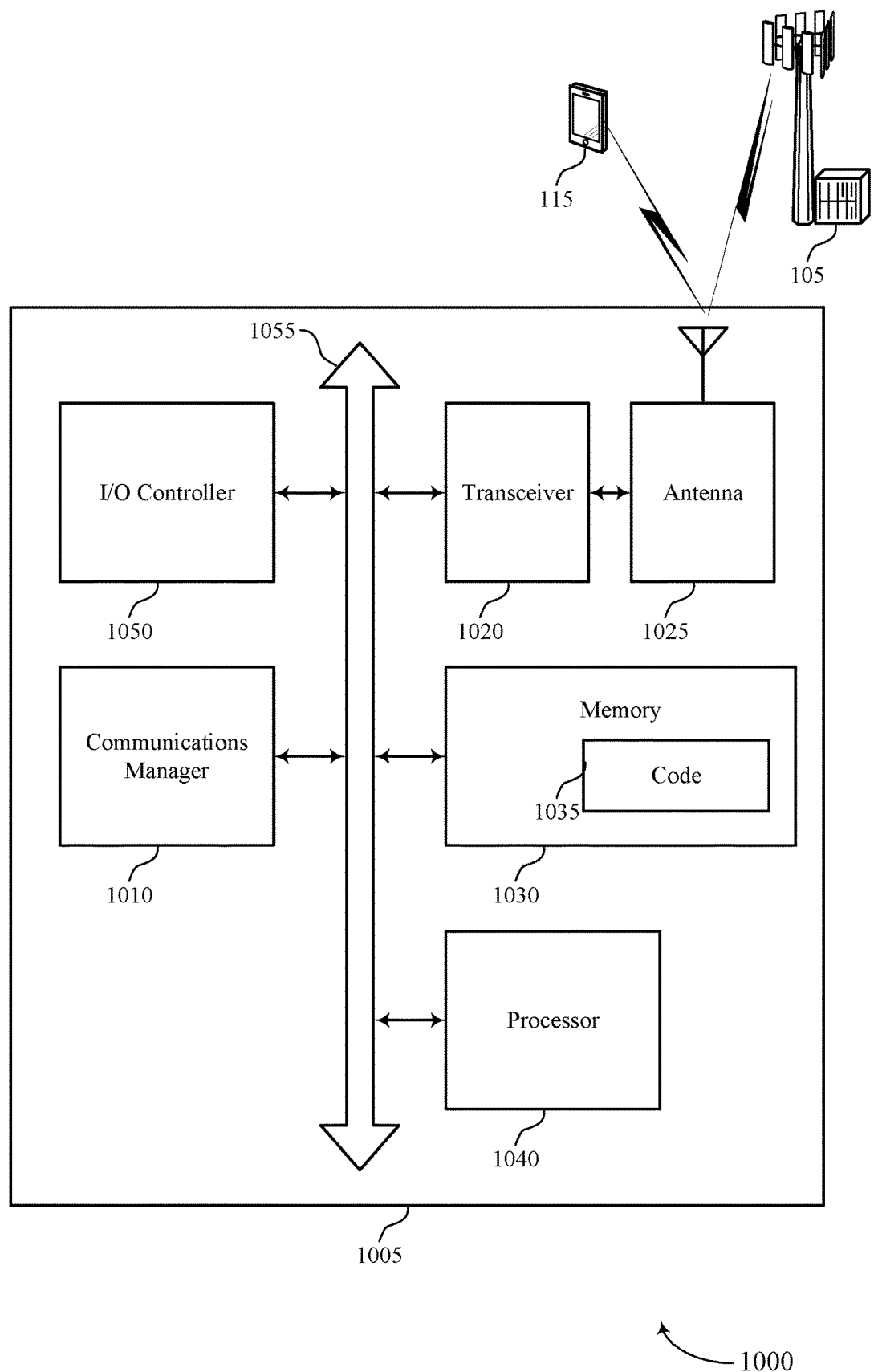
FIG. 10 shows a diagram of a system including a user equipment (UE) that supports power imbalance solutions for multiple input multiple output transmissions in accordance with aspects of the present disclosure.

FIG. 10 shows a diagram of a system 1000 including a device 1005 that supports power imbalance solutions for multiple input multiple output transmissions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be coupled (e.g., in electronic communication) via one or more buses (e.g., bus 1055).

The communications manager 1010 may identify a set of DMRS symbols corresponding to a set of DMRS ports of a multiple input multiple output configuration, generate a set of phase-rotated and precoded DMRS symbols by applying an orthogonal cover code, a phase rotation scheme, and a precoding matrix to the identified set of DMRS symbols, map the set of phase-rotated and precoded DMRS symbols to time-frequency resources corresponding to a set of antenna ports, and transmit, using a set of antennas corresponding to the set of antenna ports, a DMRS based on the mapped set of phase-rotated and precoded DMRS symbols.

The communications manager 1010 may receive, from a second wireless device, an indication of a phase rotation scheme applied, by the second wireless device, to a set of DMRS symbols corresponding to a set of DMRS ports to generate a DMRS, receive the DMRS using a set of antennas of a multiple input multiple output configuration, receive, using the set of antennas, a data signal associated with the received DMRS, and decode the received data signal based on the received DMRS and the indicated phase rotation scheme.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power imbalance solutions for multiple input multiple output transmissions).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
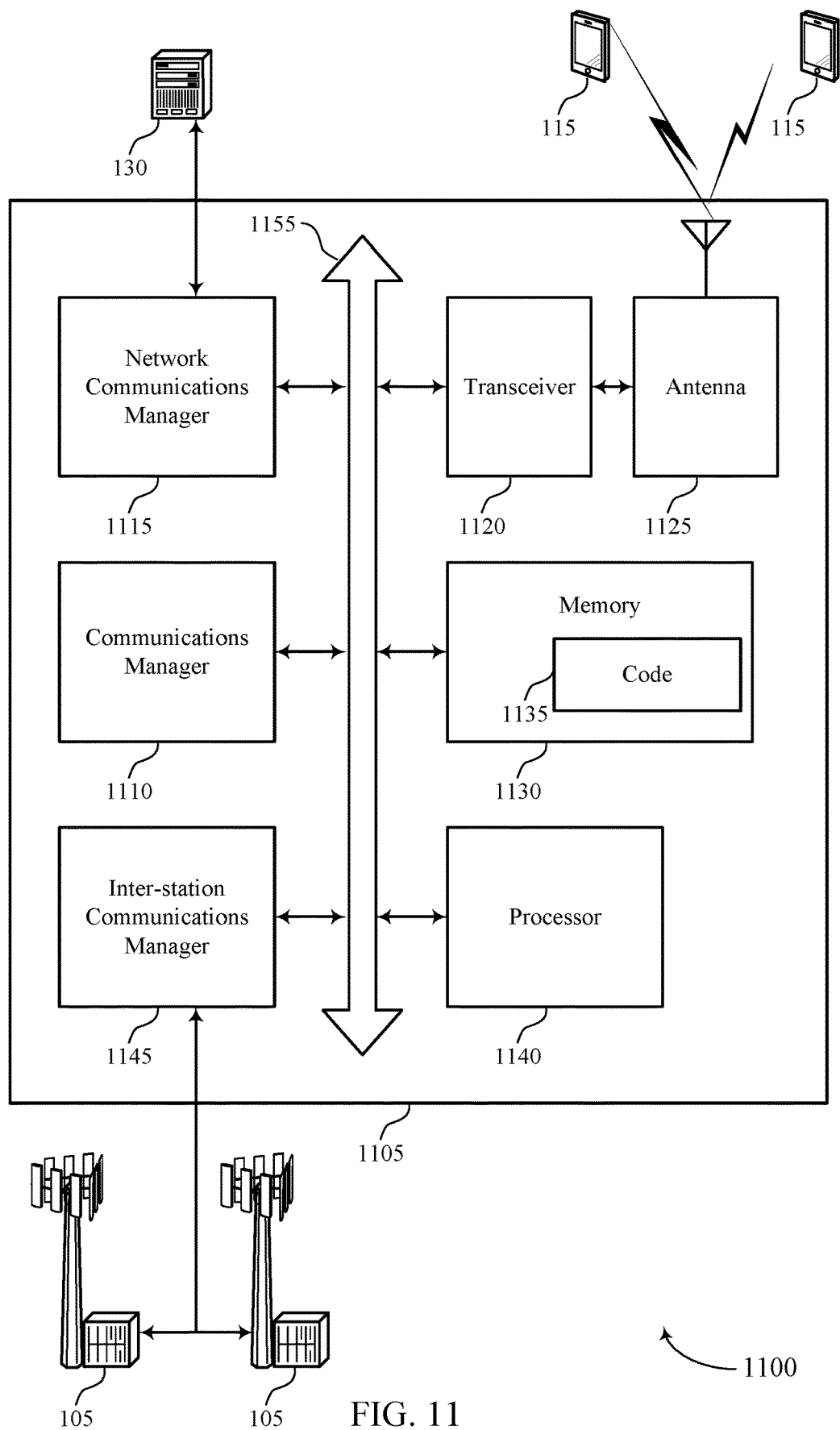
FIG. 11 shows a diagram of a system including a base station that supports power imbalance solutions for multiple input multiple output transmissions in accordance with aspects of the present disclosure.

FIG. 11 shows a diagram of a system 1100 including a device 1105 that supports power imbalance solutions for multiple input multiple output transmissions in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be coupled (e.g., in electronic communication) via one or more buses (e.g., bus 1155).

The communications manager 1110 may identify a set of DMRS symbols corresponding to a set of DMRS ports of a multiple input multiple output configuration, generate a set of phase-rotated and precoded DMRS symbols by applying an orthogonal cover code, a phase rotation scheme, and a precoding matrix to the identified set of DMRS symbols, map the set of phase-rotated and precoded DMRS symbols to time-frequency resources corresponding to a set of antenna ports, and transmit, using a set of antennas corresponding to the set of antenna ports, a DMRS based on the mapped set of phase-rotated and precoded DMRS symbols.

The communications manager 1110 may receive, from a second wireless device, an indication of a phase rotation scheme applied, by the second wireless device, to a set of DMRS symbols corresponding to a set of DMRS ports to generate a DMRS, receive the DMRS using a set of antennas of a multiple input multiple output configuration, receive, using the set of antennas, a data signal associated with the received DMRS, and decode the received data signal based on the received DMRS and the indicated phase rotation scheme.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting power imbalance solutions for multiple input multiple output transmissions).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
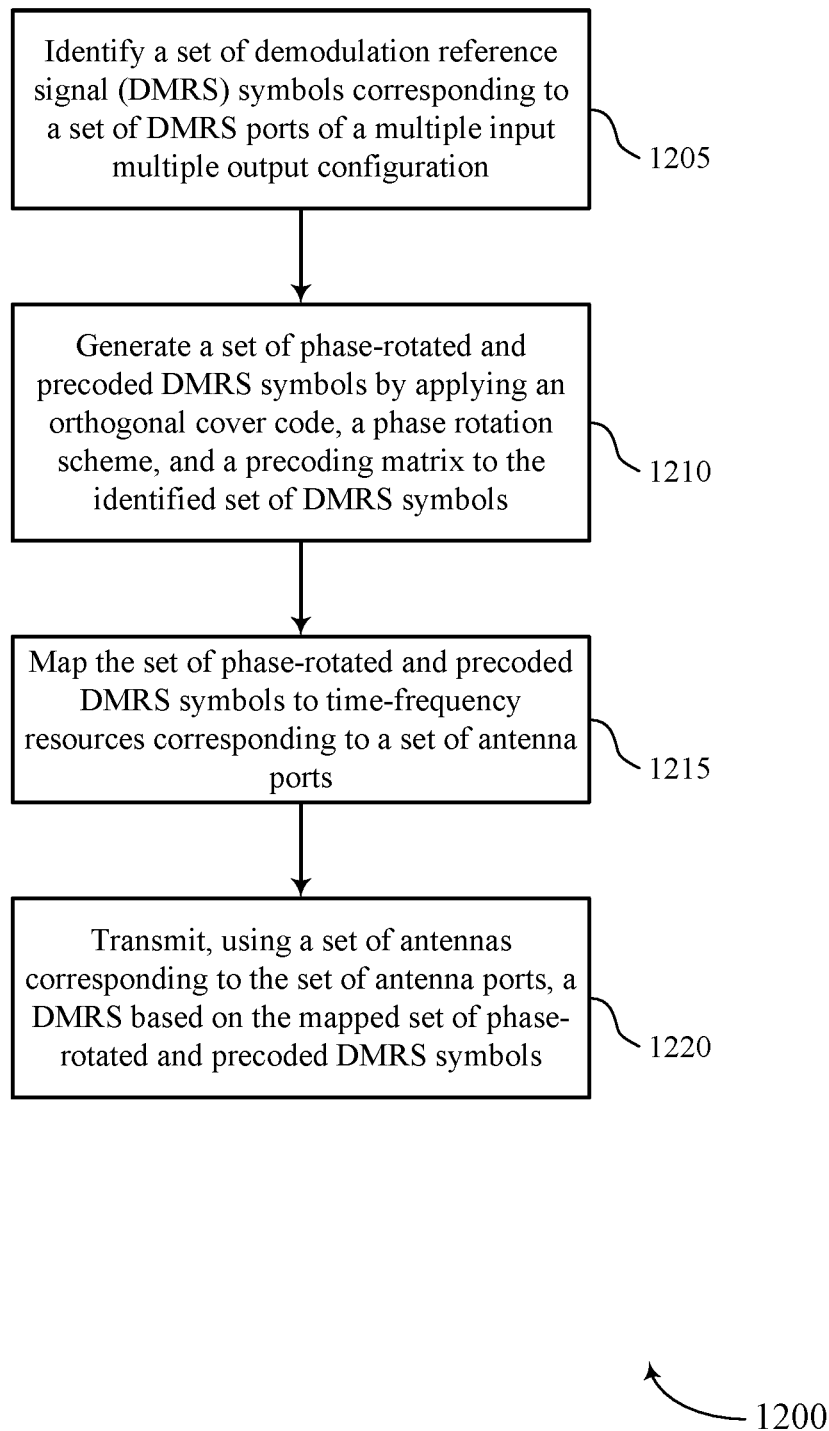
FIGS. 12 and 13 show flowcharts illustrating methods that support power imbalance solutions for multiple input multiple output transmissions in accordance with aspects of the present disclosure.

FIG. 12 shows a flowchart illustrating a method 1200 that supports power imbalance solutions for multiple input multiple output transmissions in accordance with aspects of the present disclosure. The operations of method 1200 may be implemented by a UE 115 or base station 105 or its components as described herein. For example, the operations of method 1200 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may identify a set of DMRS symbols corresponding to a set of DMRS ports of a multiple input multiple output configuration. The operations of 1205 may be performed according to the methods described herein. In some examples, aspects of the operations of 1205 may be performed by an identification module as described with reference to FIGS. 7 through 11.

At 1210, the UE or base station may generate a set of phase-rotated and precoded DMRS symbols by applying an orthogonal cover code, a phase rotation scheme, and a precoding matrix to the identified set of DMRS symbols. The operations of 1210 may be performed according to the methods described herein. In some examples, aspects of the operations of 1210 may be performed by a DMRS generation module as described with reference to FIGS. 7 through 11.

At 1215, the UE or base station may map the set of phase-rotated and precoded DMRS symbols to time-frequency resources corresponding to a set of antenna ports.

The operations of 1215 may be performed according to the methods described herein. In some examples, aspects of the operations of 1215 may be performed by a mapping module as described with reference to FIGS. 7 through 11.

At 1220, the UE or base station may transmit, using a set of antennas corresponding to the set of antenna ports, a DMRS based on the mapped set of phase-rotated and precoded DMRS symbols. The operations of 1220 may be performed according to the methods described herein. In some examples, aspects of the operations of 1220 may be performed by a DMRS transmission module as described with reference to FIGS. 7 through 11.

Figure 13:
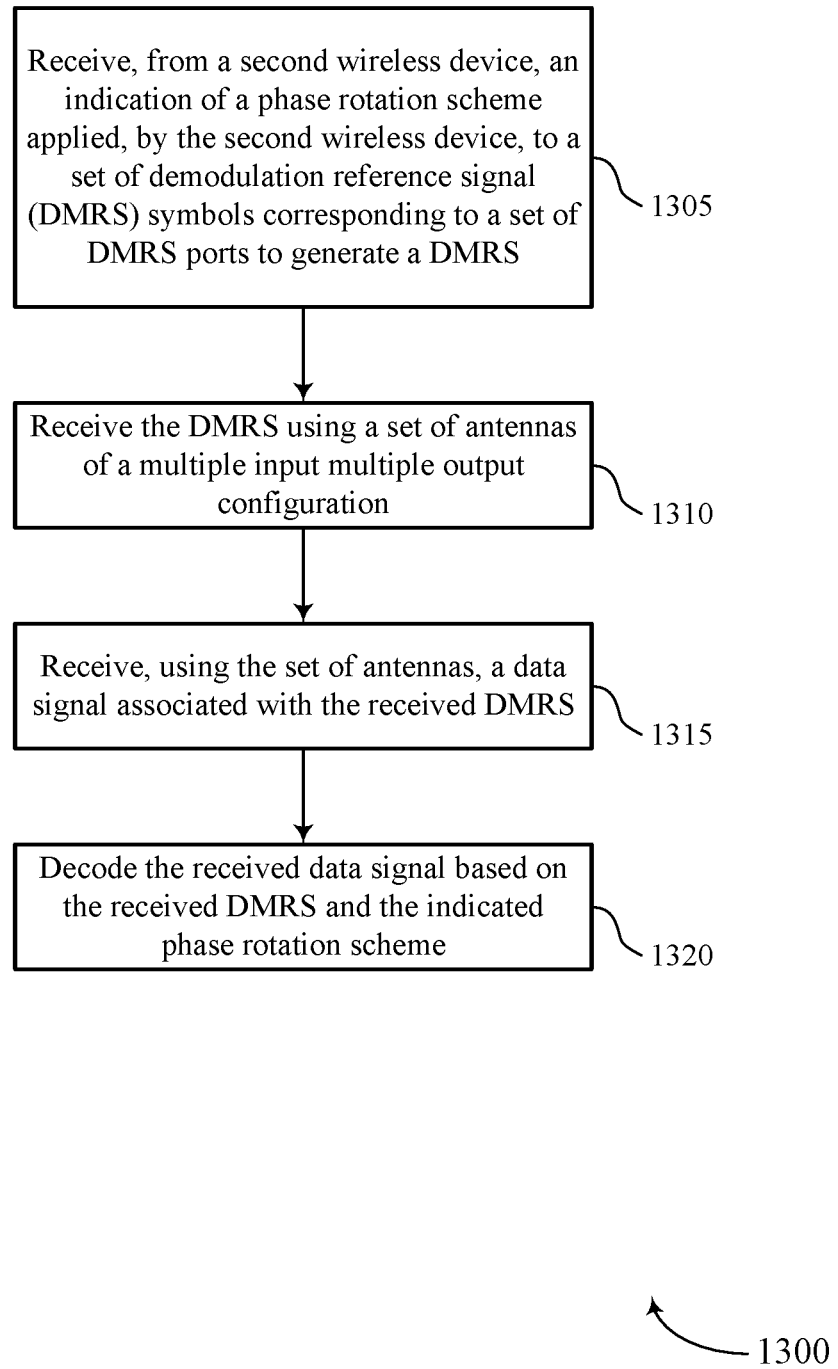

FIG. 13 shows a flowchart illustrating a method 1300 that supports power imbalance solutions for multiple input multiple output transmissions in accordance with aspects of the present disclosure. The operations of method 1300 may be implemented by a UE 115 or base station 105 or its components as described herein. For example, the operations of method 1300 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may receive, from a second wireless device, an indication of a phase rotation scheme applied, by the second wireless device, to a set of DMRS symbols corresponding to a set of DMRS ports to generate a DMRS. The operations of 1305 may be performed according to the methods described herein. In some examples, aspects of the operations of 1305 may be performed by a phase rotation module as described with reference to FIGS. 7 through 11.

At 1310, the UE or base station may receive the DMRS using a set of antennas of a multiple input multiple output configuration. The operations of 1310 may be performed according to the methods described herein. In some examples, aspects of the operations of 1310 may be performed by a DMRS reception module as described with reference to FIGS. 7 through 11.

At 1315, the UE or base station may receive, using the set of antennas, a data signal associated with the received DMRS. The operations of 1315 may be performed according to the methods described herein. In some examples, aspects of the operations of 1315 may be performed by a data reception module as described with reference to FIGS. 7 through 11.

At 1320, the UE or base station may decode the received data signal based on the received DMRS and the indicated phase rotation scheme. The operations of 1320 may be performed according to the methods described herein. In some examples, aspects of the operations of 1320 may be performed by a decoding module as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    identifying a plurality of demodulation reference signal (DMRS) symbols corresponding to a plurality of DMRS ports of a multiple input multiple output configuration;
    generating a plurality of phase-rotated and precoded DMRS symbols by applying an orthogonal cover code, a phase rotation scheme, and a precoding matrix to the identified plurality of DMRS symbols, wherein applying the phase rotation scheme comprises applying a first phase rotation to a first one or more of the plurality of DMRS ports of the plurality of DMRS symbols, and applying a second phase rotation to a second one or more of the plurality of DMRS ports of the plurality of DMRS symbols, wherein the second phase rotation is different from the first phase rotation;
    mapping the plurality of phase-rotated and precoded DMRS symbols to time-frequency resources corresponding to a plurality of antenna ports; and
    transmitting, using a plurality of antennas corresponding to the plurality of antenna ports, a DMRS based at least in part on the mapped plurality of phase-rotated and precoded DMRS symbols.

2. The method of claim 1, further comprising:
    applying the phase rotation scheme to a plurality of data symbols corresponding to the plurality of DMRS ports of the multiple input multiple output configuration, the plurality of data symbols associated with the identified plurality of DMRS symbols.

3. The method of claim 1, further comprising:
receiving an indication of the phase rotation scheme.

4. The method of claim 1, further comprising:
determining, by the first wireless device, the phase rotation scheme to apply to the identified plurality of DMRS symbols.

5. The method of claim 4, wherein determining the phase rotation scheme comprises:
determining the phase rotation scheme to apply to the identified plurality of DMRS symbols to maintain a power difference between DMRS symbols of the plurality of phase-rotated and precoded DMRS symbols less than or equal to a power difference threshold for DMRS symbols transmitted by the first wireless device.

6. The method of claim 4, wherein determining the phase rotation scheme comprises:
determining the phase rotation scheme to apply to the identified plurality of DMRS symbols to maintain a zero power difference between DMRS symbols of the plurality of phase-rotated and precoded DMRS symbols that are transmitted by the first wireless device using a same antenna port of the plurality of antenna ports.

7. The method of claim 6, wherein the zero power difference is further between each pair of two antenna ports of the plurality of antenna ports.

8. The method of claim 4, wherein determining the phase rotation scheme comprises:
selecting, from a set of phase rotation schemes, the phase rotation scheme to apply to the identified plurality of DMRS symbols.

9. The method of claim 8, wherein the phase rotation scheme of the set of phase rotation schemes corresponds to the plurality of DMRS ports, and a second phase rotation scheme of the set of phase rotation schemes corresponds to a second set of DMRS ports for DMRS.

10. The method of claim 8, wherein the phase rotation scheme to apply corresponds to the precoding matrix to apply, and a second phase rotation scheme of the set of phase rotation schemes corresponds to a second precoding matrix.

11. The method of claim 8, further comprising:
identifying two or more phase rotation schemes of the set of phase rotation schemes as corresponding to the plurality of DMRS ports, wherein the phase rotation scheme to apply is selected from the two or more phase rotation schemes.

12. The method of claim 11, wherein the phase rotation scheme is selected from the two or more phase rotation schemes based at least in part on a hybrid automatic repeat request (HARQ) process identifier, or a redundancy version identifier, or a slot index, or a precoder granularity, or a transmission reception point identifier, or a quasi-colocation identifier, or a resource block identifier, or a combination thereof.

13. The method of claim 1, further comprising:
applying the phase rotation scheme to each physical uplink shared channel transmission of a plurality of bundled physical uplink shared channel transmissions.

14. The method of claim 1, wherein applying the orthogonal cover code comprises:
applying the orthogonal cover code to the identified plurality of DMRS symbols in time, or in frequency, or a combination thereof.

15. The method of claim 1, wherein generating the plurality of phase-rotated and precoded DMRS symbols by applying the orthogonal cover code, the phase rotation scheme, and the precoding matrix to the identified plurality of DMRS symbols comprises:
applying the orthogonal cover code to the identified plurality of DMRS symbols;
phase rotating, following application of the orthogonal cover code, the identified plurality of DMRS symbols according to the phase rotation scheme; and
precoding, following the phase rotating, the plurality of phase-rotated and precoded DMRS symbols according to the precoding matrix.

16. An apparatus for wireless communication at a first wireless device, comprising: a processor, memory coupled with the processor; and instructions stored in the memory and operable, when executed by the processor, to cause the apparatus to:
identify a plurality of demodulation reference signal (DMRS) symbols corresponding to a plurality of DMRS ports of a multiple input multiple output configuration;
generate a plurality of phase-rotated and precoded DMRS symbols by applying an orthogonal cover code, a phase rotation scheme, and a precoding matrix to the identified plurality of DMRS symbols, wherein applying the phase rotation scheme comprises applying a first phase rotation to a first one or more of the plurality of DMRS ports of the plurality of DMRS symbols, and applying a second phase rotation to a second one or more of the plurality of DMRS ports of the plurality of DMRS symbols, wherein the second phase rotation is different from the first phase rotation;
map the plurality of phase-rotated and precoded DMRS symbols to time-frequency resources corresponding to a plurality of antenna ports; and
transmit, using a plurality of antennas corresponding to the plurality of antenna ports, a DMRS based at least in part on the mapped plurality of phase-rotated and precoded DMRS symbols.

17. The apparatus of claim 16, wherein the instructions are further executable by the processor to cause the apparatus to:
apply the phase rotation scheme to a plurality of data symbols corresponding to the plurality of DMRS ports of the multiple input multiple output configuration, the plurality of data symbols associated with the identified plurality of DMRS symbols.

18. The apparatus of claim 16, wherein the instructions are further executable by the processor to cause the apparatus to:
receive an indication of the phase rotation scheme.

19. The apparatus of claim 16, wherein the instructions are further executable by the processor to cause the apparatus to:
determine, by the first wireless device, the phase rotation scheme to apply to the identified plurality of DMRS symbols.

20. The apparatus of claim 19, wherein the instructions are further executable by the processor to determine the phase rotation scheme by being executable by the processor to cause the apparatus to:
determine the phase rotation scheme to apply to the identified plurality of DMRS symbols to maintain a power difference between DMRS symbols of the plurality of phase-rotated and precoded DMRS symbols less than or equal to a power difference threshold for DMRS symbols transmitted by the first wireless device.

21. The apparatus of claim 19, wherein the instructions are further executable by the processor to determine the phase rotation scheme by being executable by the processor to cause the apparatus to:

determine the phase rotation scheme to apply to the identified plurality of DMRS symbols to maintain a zero power difference between DMRS symbols of the plurality of phase-rotated and precoded DMRS symbols that are transmitted by the first wireless device using a same antenna port of the plurality of antenna ports.

22. The apparatus of claim 21, wherein the zero power difference is further between each pair of two antenna ports of the plurality of antenna ports.

23. The apparatus of claim 19, wherein the instructions are further executable by the processor to determine the phase rotation scheme by being executable by the processor to cause the apparatus to:

select, from a set of phase rotation schemes, the phase rotation scheme to apply to the identified plurality of DMRS symbols.

24. The apparatus of claim 16, wherein the instructions are further executable by the processor to cause the apparatus to:

apply the phase rotation scheme to each physical uplink shared channel transmission of a plurality of bundled physical uplink shared channel transmissions.

25. The apparatus of claim 16, wherein the instructions to apply the orthogonal cover code are executable by the processor to cause the apparatus to:

apply the orthogonal cover code to the identified plurality of DMRS symbols in time, or in frequency, or a combination thereof.

26. The apparatus of claim 16, wherein the instructions to generate the plurality of phase-rotated and precoded DMRS symbols by applying the orthogonal cover code, the phase rotation scheme, and the precoding matrix to the identified plurality of DMRS symbols are executable by the processor to cause the apparatus to:

apply the orthogonal cover code to the identified plurality of DMRS symbols;

phase rotate, following application of the orthogonal cover code, the identified plurality of DMRS symbols according to the phase rotation scheme; and precode, following the phase rotating, the plurality of phase-rotated and precoded DMRS symbols according to the precoding matrix.

27. An apparatus for wireless communication at a first wireless device, comprising:

means for identifying a plurality of demodulation reference signal (DMRS) symbols corresponding to a plurality of DMRS ports of a multiple input multiple output configuration;

means for generating a plurality of phase-rotated and precoded DMRS symbols by applying an orthogonal cover code, a phase rotation scheme, and a precoding matrix to the identified plurality of DMRS symbols, wherein applying the phase rotation scheme comprises applying a first phase rotation to a first one or more of the plurality of DMRS ports of the plurality of DMRS symbols, and applying a second phase rotation to a second one or more of the plurality of DMRS ports of the plurality of DMRS symbols, wherein the second phase rotation is different from the first phase rotation;

means for mapping the plurality of phase-rotated and precoded DMRS symbols to time-frequency resources corresponding to a plurality of antenna ports; and means for transmitting, using a plurality of antennas corresponding to the plurality of antenna ports, a DMRS based at least in part on the mapped plurality of phase-rotated and precoded DMRS symbols.

28. A non-transitory computer-readable medium storing code for wireless communication at a first wireless device, the code comprising instructions executable by a processor to: identify a plurality of demodulation reference signal (DMRS) symbols corresponding to a plurality of DMRS ports of a multiple input multiple output configuration; generate a plurality of phase-rotated and precoded DMRS symbols by applying an orthogonal cover code, a phase rotation scheme, and a precoding matrix to the identified plurality of DMRS symbols, wherein applying the phase rotation scheme comprises applying a first phase rotation to a first one or more of the plurality of DMRS ports of the plurality of DMRS symbols, and applying a second phase rotation to a second one or more of the plurality of DMRS ports of the plurality of DMRS symbols, wherein the second phase rotation is different from the first phase rotation; map the plurality of phase-rotated and precoded DMRS symbols to time-frequency resources corresponding to a plurality of antenna ports; and transmit, using a plurality of antennas corresponding to the plurality of antenna ports, a DMRS based at least in part on the mapped plurality of phase-rotated and precoded DMRS symbols.

* * * * *